(12) United States Patent
Campagna et al.

(10) Patent No.: US 6,976,510 B2
(45) Date of Patent: Dec. 20, 2005

(54) CORROSION RESISTANT METAL TUBE AND PROCESS FOR MAKING THE SAME

(75) Inventors: Guido M. Campagna, Farmington Hills, MI (US); James D. McDsniel, Ortonville, MI (US); Timothy L. Schwiebert, DeFiance, OH (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 20 days.

(21) Appl. No.: 09/765,782

(22) Filed: Jan. 19, 2001

(65) Prior Publication Data

US 2002/0005223 A1 Jan. 17, 2002

Related U.S. Application Data

(60) Provisional application No. 60/176,979, filed on Jan. 19, 2000.

(51) Int. Cl.$^7$ .................................................. F16L 11/00
(52) U.S. Cl. ........................ 138/137; 138/141; 138/143; 138/146; 428/36.91
(58) Field of Search ................................ 138/143, 146, 138/141, 137; 428/36.91

(56) References Cited

U.S. PATENT DOCUMENTS

| | | | | |
|---|---|---|---|---|
| 3,961,992 A | * | 6/1976 | Jahnke et al. ................ | 428/623 |
| 4,035,436 A | * | 7/1977 | Matsubara et al. .......... | 428/416 |
| 4,173,290 A | * | 11/1979 | Kobayashi et al. .......... | 220/678 |
| 4,213,486 A | * | 7/1980 | Samour et al. .............. | 138/143 |
| 4,232,086 A | * | 11/1980 | Mori et al. ................... | 428/341 |
| 4,293,457 A | * | 10/1981 | Simon ........................... | 260/15 |
| 4,298,661 A | * | 11/1981 | Ikeno et al. ................. | 428/623 |
| 4,312,902 A | * | 1/1982 | Murase et al. ............... | 427/386 |
| 4,514,445 A | * | 4/1985 | Hokamura et al. .......... | 427/410 |
| 4,680,346 A | * | 7/1987 | Carson et al. ............... | 525/486 |
| 4,701,354 A | * | 10/1987 | Kitamura et al. ......... | 427/255.6 |
| 4,849,301 A | * | 7/1989 | Kanasashi ................... | 428/623 |
| 4,853,297 A | | 8/1989 | Takahashi et al. | |
| 4,916,031 A | * | 4/1990 | Kitamura et al. ............ | 428/626 |
| 5,108,809 A | * | 4/1992 | Patil et al. .................. | 428/35.8 |
| 5,462,780 A | * | 10/1995 | Richards ..................... | 138/146 |
| 5,520,223 A | | 5/1996 | Iorio et al. | |
| 5,590,691 A | * | 1/1997 | Iorio et al. .................. | 138/146 |
| 5,638,871 A | * | 6/1997 | Iorio et al. .................. | 138/146 |
| 5,771,940 A | * | 6/1998 | Iorio et al. .................. | 138/146 |
| 5,859,095 A | * | 1/1999 | Moyle et al. ............... | 523/402 |
| 5,932,306 A | | 8/1999 | Usui | |
| 5,972,450 A | * | 10/1999 | Hsich et al. ................ | 138/137 |
| 6,041,827 A | | 3/2000 | Takahashi et al. | |
| 6,113,998 A | * | 9/2000 | Aizawa et al. ............. | 428/35.9 |
| 6,130,404 A | * | 10/2000 | Campagna et al. .... | 219/121.69 |
| 6,174,569 B1 | * | 1/2001 | Blomer et al. .............. | 427/410 |
| 6,276,400 B1 | * | 8/2001 | Jackson et al. ............. | 138/143 |
| 6,358,581 B1 | * | 3/2002 | Usui .......................... | 138/143 |

FOREIGN PATENT DOCUMENTS

| | | |
|---|---|---|
| WO | WO 95/30109 | 11/1995 |
| WO | WO 98/39137 | 9/1998 |

* cited by examiner

*Primary Examiner*—James Hook
(74) *Attorney, Agent, or Firm*—Young & Basile, P.C.

(57) ABSTRACT

A corrosion resistant multi-layer tube comprises a metal tube; a zinc layer bonded to the metal tube outer surface; a surface treatment layer bonded to the zinc layer; a priming layer; a first polymeric layer bonded to the priming layer; a second polymeric layer bonded to the first polymeric layer. A process for manufacturing the tube comprises the step of extruding multiple layers of a melt-processable thermoplastic to a pretreated metal tube having an external surface with at least a zinc based coating, a sealant coating on top of the zinc based coating, and a primer coating on top of the sealant coating. The primer coating is preferably applied by an airless spray system in a closed atmosphere, wherein substantially no volatile organic compounds escape into the atmosphere. The polymeric layer(s) remain adhered to the metal tube, even when exposed for prolonged periods to aggressively corrosive environments.

28 Claims, 3 Drawing Sheets

CORROSION RESISTANT METAL TUBE AND PROCESS FOR MAKING THE SAME

CROSS-REFERENCE TO RELATED APPLICATIONS

This application claims the benefit of U.S. Provisional application Ser. No. 60/176,979, filed on Jan. 19, 2000.

BACKGROUND OF THE INVENTION

This invention relates to a multi-layer coated metal tube, and more particularly to a metal tube having a primed outer surface coated with a plurality of layers of plastic material securely bonded thereto.

Metal pipes often have their outer surfaces covered with a protective coating. These pipes are used for conveying hydraulic fluids (such as for brakes, transmissions, power steering, fans, and the like), fuels (such as methanol, ethanol, gasoline, additives, diesel, kerosene, jet fuel, and mixtures thereof), vapor, and the like in a motor vehicle. As such, these pipe lines are located under the body of the vehicle. Since they are used in such a harsh environment, the pipes are required to have a high degree of corrosion resistance, scratch resistance, impact strength and mechanical wear resistance. In cold climates, it is not unusual to encounter road salt sprinkled onto road surfaces in order to prevent freezing of water on the road surfaces and the inherent dangers caused thereby. The popularity of spreading road salt has created a serious problem of pipe corrosion. The pipes are also vulnerable to damage or wear from stones or mud spattered by rotating wheels of the vehicle. It is, therefore, necessary that the pipes attached to the underbody of the vehicle be coated so as to resist both chemical corrosion and mechanical damage or wear.

Flexible fuel vehicles (FFVs) often are designed to be fueled by methanol, ethanol, gasoline, and/or any combination of these fuels. Certain fuel blends may corrosively attack metals, even some types of stainless steel. If corrosion is prolonged, fuel and/or hazardous fluids may leak from the tubing. However, emissions standards, for example those issued by the California Air Resources Board (CARB) and the U.S. EPA, mandate no leakage or permeation for as high as 150,000 miles or 15 years.

A double-rolled steel pipe has been proposed that is made by rolling a steel strip or hoop twice and brazing its longitudinal edges by means of a copper plating layer, or a seam welded steel pipe, where the pipe has an outer surface coated with an electroplated zinc film. The zinc film has an outer surface coated with a relatively thin special chromate film having, for example, an olive color. Chromate is typically used to enhance the adhesion of the subsequent layer by making the surface rougher. The chromate film has an outer surface coated with a fluorinated resin film. The fluorinated resin film is formed by impregnating the chromate film with a dispersion of polyvinyl fluoride immediately after the formation of the chromate film when it is still in the state of a gel, and drying them under heat, so that the fluorinated resin film may form an intimate bond with the chromate film. When the chromate film is formed by treating the pipe with a solution, it requires large amounts of a chromium compound and an organic acid, such as formic acid, used as a reducing agent. It is necessary to supply the treating solution with the chromium compound frequently, and to renew it at regular intervals of time in order to maintain a constant film forming capacity. The waste solution, however, contains a large amount of chromium having a valence of 6, which is a toxic substance. As such, the disposal of this toxic waste solution is very costly. Although the chromate film as formed is highly resistant to corrosion, the heat to which it is exposed during the formation of the resin film deprives it of water and thereby makes it brittle. Any plastic deformation of the pipe, such as may result from bending or double flaring, and/or any elastic deformation, such as may result from pipe handling prior to or during assembly, may form fine cracks in the chromate film which lowers its rustproofing properties.

It has also been proposed to provide a corrosion resistant pipe where a metal pipe is provided with an outer surface coated with a zinc film, a chromate film, an intermediate layer consisting sequentially of an epoxy resin, and a polyvinyl fluoride film formed one on top of another in the order listed.

A plastic-coated steel tube has also been proposed where a steel tube has an inner layer of at least one cross-linked polyolefin modified with a hydrolyzable silane and an outer unmodified or soot-blended polyolefin layer on the exposed surface of the inner layer.

A process for coating metal tubes with plastic material has also been disclosed where a fixed metal tube is heated to a temperature above the melting point of the plastic material to be employed, thereafter causing a mixture of plastic powder and air to pass through the metal tube whereby the plastic material is fritted onto the inside surface of the tube, thereafter rotating the metal tube and applying to the exterior surface thereof in a plurality of stages a plastic material, the plastic material being electrostatically sprayed onto the rotating metal tube. After each stage of electrostatically applying plastic to the outside surface of the metal tube and applying plastic material to the inside surface thereof, the plastic material is completely melted and smoothed. However, this process has several drawbacks, including that it is a batch process (as opposed to a continuous process); it requires rotation of the tube; and the cure time of the plastic material is quite slow, eg. several minutes. Thus, this process is rather inefficient, both from a cost and time standpoint.

An automobile tube line for a brake, fuel or hydraulic system has also been disclosed with an interior steel tube having a galvanized exterior layer with an additional exterior olive chromated layer which is wrapped in an additional Nylon 12 layer casing where the plastic casing is a polyamide layer applied by extrusion on top of the olive chromated layer.

In U.S. Pat. No. 5,590,691, which is incorporated herein by reference, there is disclosed a metal tube having an extruded multiple plastic layer coating bonded thereto. This tube is very corrosion resistant, yet may not be suitable in aggressively corrosive environments such as for example upon exposure to fluid soaking in 85% ethanol.

Thus, it is an object of the present invention to provide a corrosion resistant metal tube which withstands prolonged exposure to corrosive environments, including aggressively corrosive environments. It is another object of the present invention to provide such a tube and process for making the same which advantageously substantially contains any volatile organic compounds, thereby substantially preventing any undesirous venting of VOCs to the atmosphere. It is a further object of the present invention to provide a process which captures and re-uses any primer material applied to the tube, thereby advantageously substantially eliminating waste of raw material(s) and substantially preventing undesirous venting/overspray of primer to the surrounding environment. Still further, it is an object of the present invention to provide such a tube and process for making the same which exhibits good adherence between the tube and a subsequent corrosion resistant layer(s) for prolonged periods of time. Further, it is an object of the present invention to provide a process for making such a tube which is high speed thereby being advantageously cost effective.

SUMMARY OF THE INVENTION

It is desirable in the present invention to provide brake lines and fuel lines, and other lines which could be damaged by the regular use of an automobile, which can meet the continuous demand of traffic conditions and possible exposure to corrosive fluids, and therefore must have a long lasting durability of ten years or more. In such application areas, resistance to corrosion, resistance against breaking, cracking or bursting due to internal pressure, resistance to stone impact, and a high corrosion resistance against winter salt are all desirable characteristics. At this time, tube lines made of steel are currently being used in a large capacity. For brake lines, double-wrap steel tubes are suitable, whereas single wall straight bead welded steel pipes are more appropriate for fuel lines.

The corrosion resistant metal tube and process for making according to the present invention provides numerous advantages over the prior known tubing configurations. In particular, tube having a priming layer between the polymeric layer(s) and the pretreated tube promotes adherence of the polymeric layer(s), even when exposed for prolonged periods of time to aggressively corrosive environments, such as for example to 85% ethanol fluid soaks. Further, the process for applying the primer coating according to the present invention is environmentally friendly. Still further, the polyamide 12 material of choice, having a lower viscosity and lower molecular weight, allows for higher line speeds for more efficient and cost effective production.

The multi-layer tube according to the present invention comprises a metal tube having an outer surface; a zinc layer bonded to the metal tube outer surface, wherein the zinc layer is selected from the group consisting of zinc plating, zinc nickel alloys, zinc cobalt alloys, zinc aluminum alloys, and mixtures thereof; a surface treatment layer bonded to the zinc layer, wherein the surface treatment layer is selected from the group consisting of a zinc/aluminum/rare earth alloy, phosphate, chromate, and mixtures thereof; a priming layer; a first polymeric layer bonded to the priming layer, wherein the first polymeric layer is selected from the group consisting of thermoplastic elastomers, ionomers, nylons, fluoropolymers, and mixtures thereof; and a second polymeric layer bonded to the first polymeric layer, wherein the second polymeric layer is selected from the group consisting of nylons, thermoplastic elastomers, fluoropolymers, and mixtures thereof.

A process according to the present invention for manufacturing a multi-layer tubing for conveying fluids comprising the step of extruding multiple layers of a melt-processible thermoplastic to a pretreated metal tube having an external surface with at least a zinc based coating, a sealant coating on top of the zinc based coating, and a primer coating on top of the sealant coating. The primer coating is preferably applied by an airless spray system in a closed atmosphere, wherein substantially no volatile organic compounds escape into the atmosphere.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED AND ALTERNATIVE EMBODIMENTS

Figure 1:
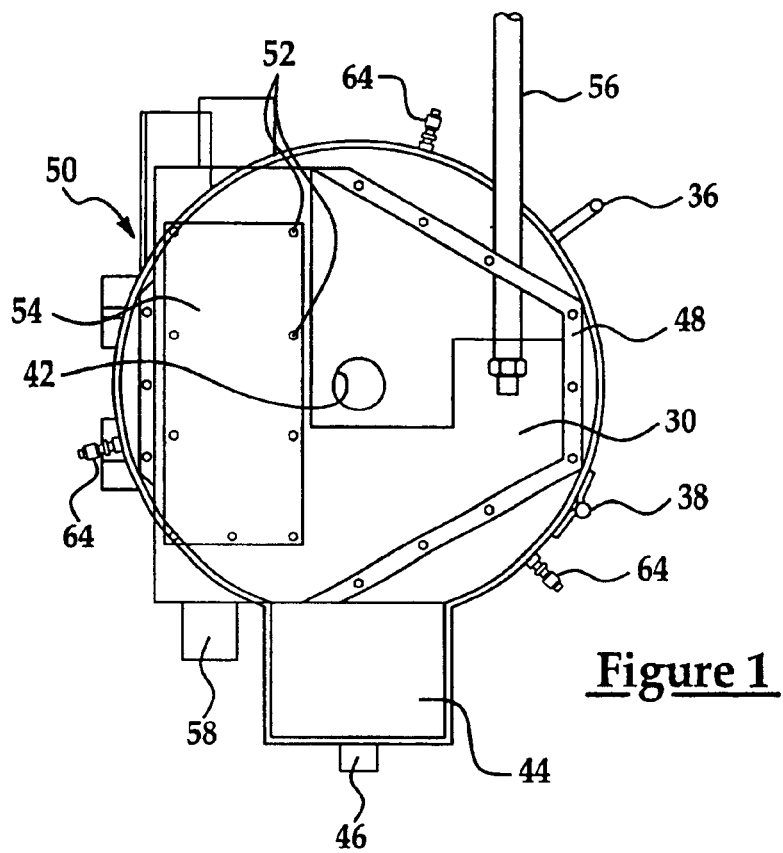
FIG. 1 is a semi-schematic end view of the paint booth used in conjunction with the closed atmosphere, airless spray system according to the present invention for applying the primer.

The multi-layer tubing 10 according to the present invention includes a metal tube or pipe 12. The metal tube 12 may be welded steel tube, brazed steel tube, aluminum, copper or stainless steel. The process of the present invention is capable of applying a multi-layer coating over any rigid or semi-rigid tubular material. Of particular interest in the present invention, is the mechanical durability and corrosion resistance advantage obtained with carbon steel in either a welded single wall or brazed double wall form of tube or piping. Application of multi-layer coatings on other materials may be of a decorative nature with some protection also being obtained, for example improved chemical resistance of the outer shell of the multi-layer coating over the underlying rigid or semi-rigid tubular material.

The metal tubing 12 is pretreated as required through various clean and rinse stages. In addition, the pretreating of the metal surface may also include pickling to remove oxides and to improve the metal surface for deposition of a metal based coating, such as a zinc based coating that is applied by hot dip galvanization, sometimes referred to as the "hot process" as previously described, or the preferred method of electrolytic bath coating or plating sometimes referred to as the "electrolytic or cold process" as previously described. In the alternative, previously pretreated metal tubing 12 may be supplied to the zinc based coating process step according to the present invention, or a previously zinc base coated metal tubing 12 may be supplied to the surface treating step of the process according to the present invention. In either case, metal tubing 12 with a zinc based coating applied thereon in a range of 0.4 to 1.0 mil is either produced or supplied for subsequent treating as will be disclosed hereinafter according to the present invention.

The external surface of the zinc based coating is treated to seal the zinc based coating to prolong its corrosion resistance and to provide a suitable surface for application of and bonding to extruded multiple layers of plastic to be subsequently supplied. The surface treatment of the zinc based coating is at least one of the surface sealing treatments selected from the group of a phosphate coating, a chromate coating including the clear, yellow and green versions, a zinc-aluminum alloy coating, and combinations thereof. A suitable zinc-aluminum alloy and coating is described in U.S. Pat. No. 4,448,748 which is incorporated herein by reference, and ASTM Designation: B750-88 provides a standard specification for zinc-5% aluminum-mischmetal alloy in ingot form hot-dip coatings, which is also incorporated herein by reference. Metal tubing pretreatment prior to plastic application can include combinations such as zinc-aluminum alloy with a phosphate coating and a chromate coating, zinc plate with a chromate coating, zinc plate with a phosphate coating and a chromate coating, galvanized zinc with a phosphate coating and/or a chromate coating, zinc-nickel alloy plate with a phosphate coating and/or a chromate coating, zinc-cobalt alloy with a phosphate coating and/or a chromate coating, a chromate coating of the clear, yellow and green versions, and combinations thereof. The pretreatment of the metal surface prior to the zinc base coating can include sand, shot or bead blasting, or other means of abrading the surface to roughen it, or detergent cleaning with rinse and acid pickling followed by a rinse. Any suitable surface abrading or etching process, either chemical or mechanical, may be used as a pretreatment prior to any other surface treatment and/or prior to extruding plastic onto the metal surface. The chromate coating can be applied as a wash having essentially no remaining weight. The zinc-aluminum alloy coating can be applied with a weight selected in a range of between 36 to 95 g/m$^2$ inclusive, and with a preferred weight range of between 75 to 80 g/m$^2$ inclusive and a most preferred weight of 78 g/m$^2$. The phosphate coating can be applied with a weight in the range of between 120 to 250 mg/ft$^2$ (1.292 to 2.691 g/m$^2$) inclusive. The zinc based coating on the metal surface is preferably in the range of between 13 to 35 microns inclusive.

Various combinations of multi-layer tubing 10 according to the present invention have been prepared with metal tube 12 having a 3/16 inch diameter brazed tube, or 5/16 inch and 3/8 inch diameter welded steel tube. The process according to the present invention is not size dependent, and therefore it is anticipated that other sizes, including smaller sizes and larger sizes, of metal tube 10 can be processed according to the present invention.

The zinc-aluminum galvanizing alloy or coating preferably contains from about 85% to 97% zinc, from about 4% to 15% aluminum and at least about 5 ppm mischmetal (a variety of known rare earth containing alloys).

After treating the surface of the zinc based coating or layer 14 with the surface treatment layer 16, a primer 17 is applied. The primer 17, which promotes adherence of the polymeric layer(s) to the metal substrate, even when exposed for prolonged periods of time to aggressively corrosive environments (such as for example to 85% ethanol fluid soaks) will be discussed further below. Multiple plastic layers are extruded on the treated surface 16 of the zinc based layer 14. In the alternative, multiple plastic layers can be extruded on to the external surface of the metal tube 12 without pretreatment. In either case, the multiple plastic layers preferably include at least an alloy or bonding layer, referred to herein as a first layer 18 formed on top of the treated surface layer 16 and an external shell or second layer 22 exposed to the outside environment. An optional intermediate or third layer 20 may be provided between the first layer 18 and the second layer 22 and may include one or more sublayers of plastic materials.

Prior to extruding the multiple plastic layers onto the treated surface 16, the metal tube 12 is preheated to temperatures in the range of between 177° C. to 232° C. (350° F. to 450° F.) inclusive, with a preferred range of between 204° C. to 232° C. (400° F. to 450° F.) inclusive. The multiple layers of extruded plastic form a coating over the treated surface 16 with an overall thickness in a range of between 75 to 300 microns (3 to 12 mils), with a preferred range of between 125 to 250 microns (5 to 10 mils). Individual plastic layers can be applied with a thickness in a range of between 10 to 250 microns (0.3 to 10 mils) inclusive, with a preferred range of between 125 to 250 microns (5 to 10 mils) inclusive.

A more detailed description of the process according to the present invention follows. The tubing 12 as previously described is subjected to a clean and rinse step followed by a pickling process step to remove oxides and to improve the external metal surface for subsequent flash plating. After the pickling step, the metal tubing 12 is subjected to a rinse step. The electroflux and flash plate with zinc step then applies the zinc based layer of a thickness in the range of 0.4 to 1.0 mil inclusive. A zinc-aluminum alloy coating is then applied to the external surface of the zinc based layer. A suitable zinc-alloy coating is commercially available under the tradename GALFAN from Eastern Alloys, Inc. of Maybrook, N.Y. The sealing step of applying GALFAN while controlling the thickness in a range of 36 to 95 g/m$^2$ with a most preferred thickness of 78 g/m$^2$, is followed by a water quench step to bring the tubing 12 back to ambient temperature, followed by a rinse step. It is to be understood that any of the quenching steps as discussed herein may be performed using any suitable material or process. A phosphate surface may be applied to the external surface of the GALFAN coating for improved adhesion of subsequent layers. A rinse step follows the phosphating step. The application of a chromate coating occurs to seal the phosphate surface applied. The phosphate surface is preferably applied with a thickness in the range of 120 to 250 mg/ft$^2$ (1.292 to 2.691 g/m$^2$), while the chromate coating may be applied as a wash having essentially no remaining weight on the tubing upon completion. After the chromate wash step, the multiple layers of plastic are extruded onto the metal tubing 12. Preferably, the tubing has been heated in a range of between 375 to 450° F. inclusive with a preferred temperature of 425° F. prior to the application of the multiple layers of plastic. A conventional mechanical applicator or extrusion head is used for coextruding the multiple layers of plastic simultaneously onto the surface of the preheated metal tube 12. In the preferred configuration, vacuum is applied to the head of the applicator to pull the plastic material down onto the surface of the preheated tube 12. The vacuum applied is preferably in the range of 1 inch to 22 inches of water (where 28 inches of water is equal to atmospheric pressure), with a preferred vacuum pressure of 10 inches of water. After extrusion of the multiple layers of plastic, the tubing 12 is subjected to a quench, which can be a water quench, oil quench or other material quench as required, and is thereafter coiled or cut to finished length.

In lieu of coextrusion, the process could also be carried out as a cross-head application wherein the layers are applied synchronously instead of simultaneously. However, this process is not as preferred as the coextrusion, in that there is a greater likelihood of loss of bonding efficiency and bonding properties, and there tends to be less control over layer thicknesses.

Figure 4:
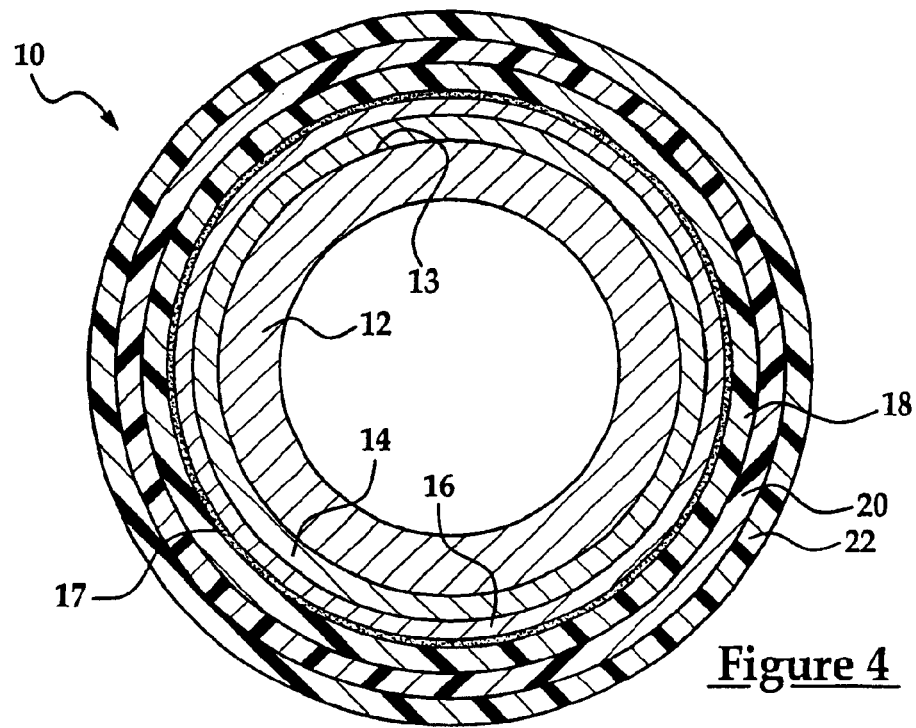
FIG. 4 is a cross-sectional view of a tubing according to the present invention with the layer thicknesses exaggerated for purposes of illustration.

Referring now to FIG. 4, the multi-layer tube of the present invention is designated generally as 10. Multi-layer tube 10 comprises a tube or pipe 12 having an outer surface 13. Tube 12 may be formed in any conventional manner and of any suitable material. For example, tube 12 may be a welded single wall steel tube, a brazed double wall steel tube, etc. Further, aluminum, stainless steel and the like also may be used. Yet still further, tube 12 may be formed from any rigid or semi-rigid tubular material. Tube 12 may be of circular cross section as shown, however, it is to be understood that tube 12 may be formed of any suitable size and/or shape, including square, rectangular and other geometric configurations.

A zinc layer 14 is bonded to the metal tube outer surface 13. It is to be understood that any suitable zinc layer 14 may be used in accord with the present invention. However, in the preferred embodiment, the zinc layer is selected from the group consisting of zinc plating, zinc nickel alloys, zinc cobalt alloys, zinc aluminum alloys, and mixtures thereof.

A surface treatment layer 16 is bonded to the zinc layer 14. Any suitable surface treatment layer 16 may be used. However, in the preferred embodiment, surface treatment layer 16 is selected from the group consisting of a zinc/aluminum/rare earth alloy, phosphate, chromate, and mixtures thereof.

The phosphate and/or chromate may be applied in any suitable manner. In the preferred embodiment, a hot phosphoric acid is used. Without being bound to any theory, it is believed that this acid etches into the metal surface, leaving a phosphate crystalline structure in the metal, which structure aids in subsequent adhesion of polymeric materials. Over electroplating, a wet bath chromate may be used, after which the metal is rinsed well. Chromium oxides are left on the metal, which are believed to aid in corrosion resistance, and which, although optional, are further believed to enhance the advantageous properties of the phosphate. Over the zinc/aluminum/rare earth alloy treatment, a dry chromate may be used which does not require subsequent rinsing.

The zinc/aluminum/rare earth alloy used is preferably GALFAN, commercially available from Eastern Alloys, Inc. in Maybrook, N.Y.; licensed from the International Lead Zinc Research Organization, Inc. located in New York, N.Y.; and described in U.S. Pat. No. 4,448,748, discussed more fully above. Particularly preferred is the combination of the GALFAN with the phosphate, or the GALFAN with the phosphate and chromate. Without being bound to any theory, it is believed that either of these two combinations for the surface treatment layer 16 are particularly advantageous and useful in the present invention.

It is to be understood that the zinc layer 14 and/or surface treatment layer 16 may be optional components of the present invention. Various polymeric compositions may be applied directly to a bare metal surface, especially for decorative purposes. Further, it is contemplated that various polymeric compounds and/or blends, including those containing suitable ionomers, may substantially bond to an untreated metal surface, thereby giving the numerous corrosion and abrasion resistant properties enumerated herein.

A primer 17 is applied beneath the polymeric layer(s), to the outer surface of the metal tube 12 having any desired pretreatment/coatings thereon. The primer may be any suitable primer which would promote adhesion of the polymeric layer(s) to the metal tube 12, even under aggressively corrosive conditions. In the preferred embodiment, the primer is Nylon Primer 2BME45451, commercially available from Akzo Nobel Co. A product data sheet for this material is appended hereto as Table A. An MSDS for this material is appended hereto as Table B.

A first polymeric layer 18 is bonded to the surface treatment layer 16. It is to be understood that any suitable polymeric layer may be used which suitably bonds to the surface treatment layer 16, and in turn, suitably bonds to subsequent polymeric layers, if any. In the preferred embodiment, the first polymeric layer 18 is selected from the group consisting of a thermoplastic elastomer, an ionomer, a nylon, a fluoropolymer, and mixtures thereof.

A second polymeric layer 22 may be bonded to the first polymeric layer 18 (not shown). It is to be understood that any suitable polymeric layer may be used which suitably bonds to first layer 18, and which provides suitable mechanical and chemical corrosion resistance. In the preferred embodiment, the second polymeric layer 22 is selected from the group consisting of a nylon, a thermoplastic elastomer, a fluoropolymer, and mixtures thereof.

The multi-layer tube 10 may further comprise a third polymeric layer 20 interposed between, and bonded to the first and second polymeric layers. It is to be understood that any suitable polymeric layer may be used which suitably bonds to first layer 18 and to the second layer 22 and which may optionally provide suitable cushioning, if desired. In the preferred embodiment, the third polymeric layer 20 is selected from the group consisting of an ionomer, a nylon, ethylene vinyl alcohol, a polyolefin, and mixtures thereof.

It is to be understood that any or all of the three-layers, 18, 22, 20 may include multiple sublayers (not shown). Further, it is to be understood that each of the layers and/or sublayers may be formed from a single compound listed in the relevant group, or from a combination thereof. Still further, it is to be understood that each-of the layers/sublayers may be comprised of the same material. The thickness of the combined polymer layers can be as little as 0.004 inch, and can be made even thinner. Successful coatings have been applied having combined polymer layer thicknesses of 0.004 inch, 0.005 inch, 0.006 inch, 0.007 inch, 0.009 inch and 0.010 inch, with a preferred range of 0.005 inch to 0.010 inch.

Examples of suitable compounds for each of the layers will be described hereinafter.

One of the advantages of the present invention is that a chemical or mechanical bond is formed between all the layers. It is believed that good bonding prevents moisture buildup beneath the layers, which buildup greatly increases the likelihood of corrosion.

The thermoplastic elastomers which can successfully be employed in the tubing 10 of the present invention are commercially available under tradenames such as: SANTOPRENE, a thermoplastic rubber commercially available from Advanced Elastomer Systems of St. Louis, Mo.; KRATON, a thermoplastic rubber composed of a styrene-ethylene/butylene-styrene block copolymer commercially available from Shell Chemical Co. of Houston, Tex.; SARLINK, an oil resistant thermoplastic commercially available from Novacor Chemicals of Leominster, Mass.; and VICHEM, a family of polyvinyl chloride compounds commercially available from Vichem Corporation of Allendale, Mich.

Of the various thermoplastic elastomers suitable in the present invention, HYTREL is a preferred compound. HYTREL is a thermoplastic elastomer commercially available from E.I. DuPont de Nemours & Co., located in Wilmington, Del. It is contemplated that any grade of HYTREL is useful in the present invention, preferably such a grade which possesses a Shore D Hardness ranging between about 40 and about 55, and still more preferably, one having a Shore D Hardness of about 40. Grades having D40 (Shore) hardness include G-4074; G-4078; 4056; and 4059 FG.

A suitable nylon material includes 12 carbon block polyamides, 11 carbon block polyamides, and zinc chloride resistant 6 carbon block polyamides. Of these, Nylon 12 and zinc chloride resistant Nylon 6 are preferred. The 6-carbon block polyamide or Nylon 6 either inherently exhibits zinc chloride resistance or contains sufficient quantities of modifying agents to impart a level of zinc chloride resistance greater than or equal to that required by Performance Requirement 9.6 as outlined in SAE Standard J844 (Revised June 1990), i.e. non-reactivity after 200 hour immersion in a 50% by weight zinc chloride solution. The Nylon 6 can also be modified with various plasticizers, flame retardants and the like in manners which would be known to one reasonably skilled in the art.

Most preferred as the polymeric material of the first and second polymeric layers is Nylon 12. Preferably, the Nylon 12 of choice is VESTAMID X 7377, commercially available from Huls-Creanova. A product data sheet for this material is appended hereto as Table C; and an MSDS is appended hereto as Table D. This material has lower viscosity and lower molecular weight, thus advantageously allowing for higher line speeds during multi-layer tubing 10 production.

Suitable fluoropolymers may include polyvinylidine fluoride, polyvinyl fluoride, ethylene tetrafluoroethylene, and mixtures thereof. The material can also be a graft copolymer of the preceding materials together with a fluorine-containing polymer such as copolymers of vinylidine fluoride and chlorotrifluoroethane. Suitable material employed may contain between about 60% and about 80% by weight polyvinylidine difluoride. Materials so formed have a melting point between about 200° C. and about 220° C. and a molding temperature between about 210° C. and about 230° C.

Further suitable fluoropolymers include: a copolymer of a vinyl fluoride and chlorotrifluoroethylene, the vinyl fluoride material selected from the group consisting of polyvinylidine fluoride, polyvinyl fluoride, and mixtures thereof; a copolymer of vinyl fluoride material and ethylene tetrafluoroethylene; a non-fluorinated elastomer, and mixtures thereof. The material of choice exhibits an affinity to polymers employed in the first 18 second 22 or third 20 layers, such as, for example, Nylon 12 or Nylon 6. Some suitable fluoropolymers are commercially available under the tradename "ADEFLON A" from Atochem Inc. elf Aquitaine Group of Philadelphia, Pa.

Other suitable materials, especially useful in an interposed layer 20 or in sublayers of any of the three layers 18, 22, 20 include ethylene vinyl alcohol, selected from the group consisting of copolymers of substituted or unsubstituted alkenes having less than four carbon atoms and vinyl alcohol, and mixtures thereof. Also useful are copolymers of alkenes having less than four carbon atoms and vinyl acetate. Also suitable are polyolefin compounds, including, but not limited to polyethylene, low density polyethylene, and polypropylene.

The multi-layer tube 10 may have the first polymeric layer 18 consisting essentially of an ionomer and a nylon, such as ethylene methacrylic acid copolymer-partial metal salt, and Nylon 12. This may be in any suitable percent composition and may have any additional suitable additives. In the preferred embodiment, this percent composition ratio is between about 10% and about 70% ethylene methacrylic acid copolymer-partial metal salt, and between about 90% and about 30% Nylon 12. More preferably, this percent composition ratio is between about 40% and about 60% ethylene methacrylic acid copolymer-partial metal salt, and between about 60% and about 40% Nylon 12.

The second polymeric layer 22 may consist essentially of a nylon. In the preferred embodiment, this layer is Nylon 12.

Third layer 20 may be any of the suitable materials listed hereinabove. In an alternate preferred embodiment, this third layer 20 may be a "regrind" or "recycle" of the suitable polymeric materials enumerated above. It is to be understood that the definition of "regrind" or "recycled" material as used herein comprises any generation of "regrind" or "recycled" material which substantially possesses between about 65% and about 95% (or higher) of each of the cold temperature impact, viscosity and elongation properties of the virgin material; more preferably, possesses between about 80% and 95%, and still more preferably possesses between about 90% and 95%. However, it is to be understood that any suitable regrind which performs in the desired manner in the present invention is contemplated and may successfully be used herein. If such a "regrind" is used as third layer 20, it is preferred that a virgin material be used as second (outer) layer 22.

The process for applying the primer is described and shown in FIGS. 1–3, 5 and 6. This process is an airless spray system, having a closed atmosphere. This system provides a uniform coating of primer. Further, it is environmentally friendly in that virtually no noxious fumes escape to the atmosphere, virtually all the primer is captured and reused, and since it is a closed atmosphere, the amount of solvent used is reduced-the operator does not need to keep adding solvent since there is little appreciable solvent loss. Negative pressure in the paint booth prevents escape of VOCs into the atmosphere. A chemical is added into the water scrubber which causes VOCs to coagulate and rise to the surface, which coagulants may then be skimmed off the top and disposed of in an environmentally safe manner.

Figure 2:
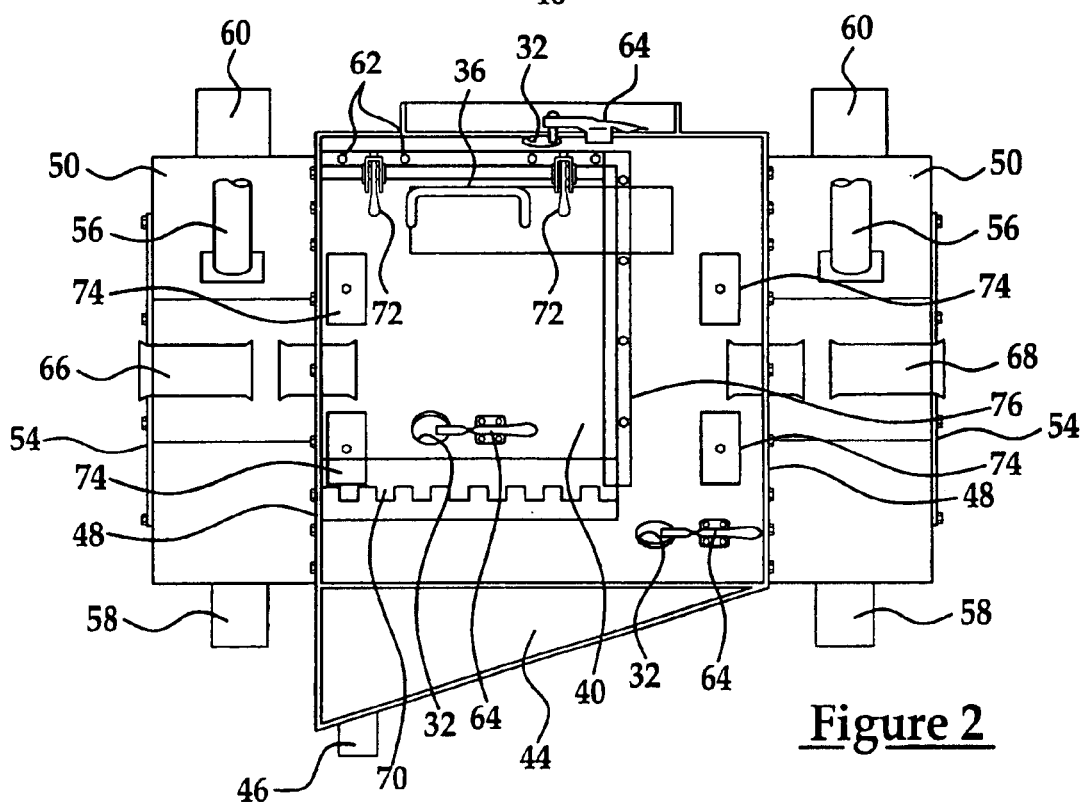
FIG. 2 is a semi-schematic front view of the paint booth used in conjunction with the closed atmosphere, airless spray system according to the present invention for applying the primer.
Figure 3:
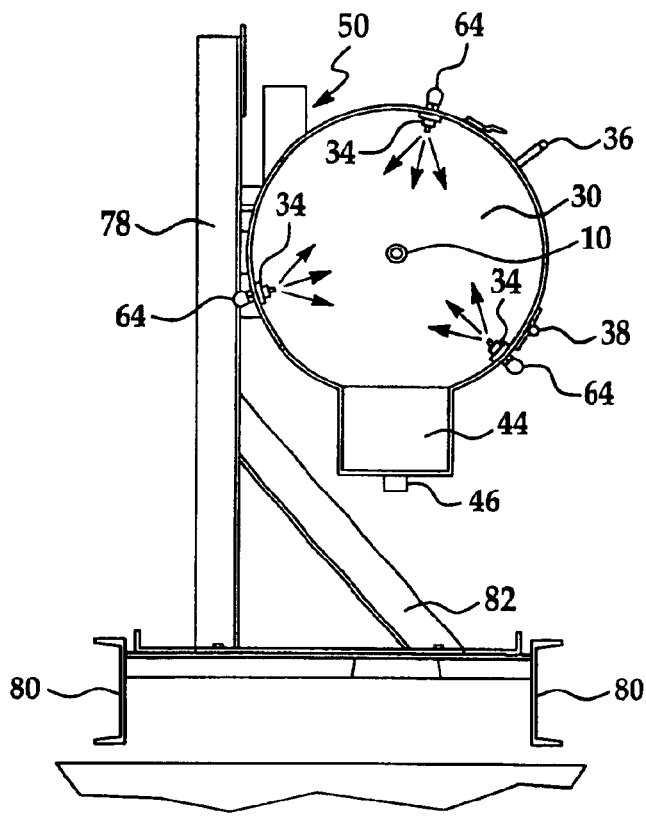
FIG. 3 is a further semi-schematic end view of the paint booth used in conjunction with the closed atmosphere, airless spray system according to the present invention for applying the primer.
Figure 6:
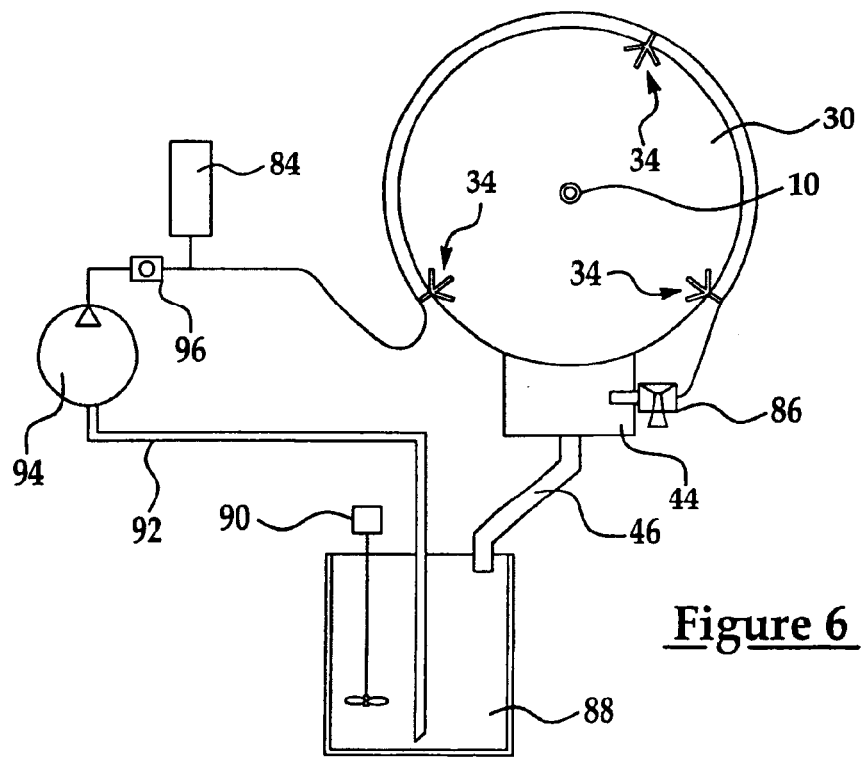
FIG. 6 is a schematic view of the closed atmosphere, airless spray system according to the present invention for applying the primer.

Referring now to FIGS. 1 and 2, paint booth 30 includes paint inlets 32 spaced about paint booth 30. Paint nozzle assemblies 34 (as best seen in FIGS. 3 and 6) enter the interior of paint booth 30 via inlets 32. Clamps 64 are adapted to hold nozzle assemblies 34 in place.

Paint booth 30 further comprises mounting bosses 74 and an access hatch 40. Hatch 40 includes a handle 36 and hinge 38. In a preferred embodiment, hinge 38 comprises a piano hinge 70. Clamps 72 are adapted to selectively hold batch 40 closed. Hatch 40 further includes a gasket and backing plate assembly 76 and fasteners 62 therefor. Further, paint booth 30 is operatively connected to a sump 44 and a paint return conduit 46.

The workpiece, namely tubing 10, enters paint booth 30 via workpiece inlet port 66 and exits via workpiece outlet port 68. It is to be understood that ports 66, 68 may be of any geometric configuration; however, in the preferred embodiment, port 66, 68 have a circular configuration 42.

Water scrubber assemblies 50 are operatively connected to paint booth 30 via flange 48. Water scrubber assemblies 50 include a cover plate and gasket assembly 54 and associated fasteners 52. Water scrubber assemblies 50 further comprise water scrubber water supply tubes 56, drains 58 and exhaust outlets 60.

Figure 5:
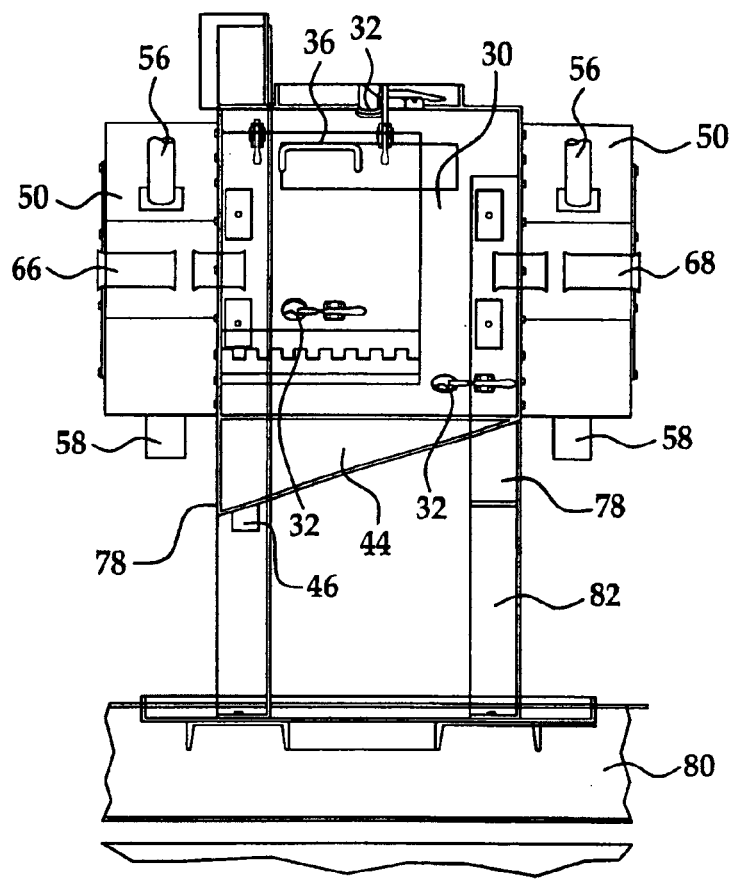
FIG. 5 is a further semi-schematic front view of the paint booth used in conjunction with the closed atmosphere, airless spray system according to the present invention for applying the primer.

Paint booth 30 and water scrubber assemblies 50 may be mounted on a suitable stand if desired. As best seen in FIGS. 3 and 5, such a stand may include posts 78, beams 80 and gussets 82.

FIG. 3 schematically depicts flow from paint nozzle assemblies 34. As is evident from FIG. 3, the entire outer circumference of tubing 10 is covered via spray from the three nozzles 34.

Referring now to FIG. 6, paint is mixed in paint reservoir and mixing drum 88 via paint mixer 90. The paint is drawn out of drum 88 via paint suction line 92 and flows through pump 94 and check valve 96. An accumulator 84 and paint circulation valve 86 are also in fluid communication at appropriate areas.

To further illustrate the composition, the following examples are given. It is to be understood that these examples are provided for illustrative purposes and are not to be construed as limiting the scope of the present invention.

EXAMPLE I

A $\frac{3}{16}$ inch brazed steel tube had a GALFAN coating of 78 g/m$^2$ and a phosphate coating of 120–250 mg/ft$^2$, with an additional chromate wash, with the chromate wash having essentially no remaining weight. A primer commercially available from Akzo Nobel under the tradename Nylon Primer 2BME45451 was applied to the tube having the GALFAN/phosphate/chromate as described immediately above. The primer was applied by the airless spray system as described further hereinabove. Applied thereto were two layers of Nylon 12 (VESTAMID X7377) having a total thickness between about 0.005 inch to 0.010 inch.

EXAMPLE II

The tubing of Example I was cut into 6 tube specimens and was subjected to various tests. The tests are described in Table E appended hereto. The test results are described in Table F appended hereto.

EXAMPLE III

The tubing of Example I was cut into 3 tube specimens and was subjected to various tests. The tests are described in Table E appended hereto. The test results are described in Table G appended hereto.

TABLE A

| AKZO NOBEL | | TUBE COATINGS Product Data Sheet |
| --- | --- | --- |
| Date: | Aug. 13, 1998 | PRODUCT DESCRIPTION |
| Product Name: | Nylon Primer | Adhesion promoting primer for under Nylon over Galfan tubing. The primer improves the adhesion, flexibility and corrosion of the Nylon coating. |
| Akzo Nobel Code: | 2BME45451 | |
| Prepared For: | ITT Automotive | |
| PHYSICAL PROPERTIES | | |
| Wt./Gal.: | 9.46 0.3 | APPLICATION PROPERTIES |
| Theor. Solids by WT. % | 53.6% 3 | Equipment: Spray |
| Theor. Solids by Vol. % | 37.7% 3 | Substrate: Galfan |
| Viscosity: | 25–30 sec @ 80° F. | Primer: |
| Viscometer: | #4 Zahn | Surface Preparation: Bonderite 1421 |
| Gloss: | Medium @ 60° @ 85° | Application Viscosity: 15–20 sec #4 Ford cup Reducer: PM Acetate |
| Hardness: | F Turquoise Min | Recommended Film Thickness: |
| Cure Test: | 50+ MEK rubs | Wet: 0.2–0.5 mils |
| Forming Test: | 3T min | Dry: 0.15 +− 0.05 mils Bake Schedule: Induction curing |

TABLE A-continued

| AKZO NOBEL | TUBE COATINGS Product Data Sheet |
| --- | --- |
| Remarks: | Setting for desired PMT ° F. Peak Metal Temperature: 450–550° F. |

TABLE B

MATERIAL SAFETY DATA SHEET
DATE PRINTED: Dec. 15, 1996    $45451    IPL#   TO#20015

SECTION 1

MANUFACTURERS NAME:
    AKZO COATINGS INC.
STREET ADDRESS:
    1845 MAXWELL
    TROY, MI 48084
EMERGENCY TELEPHONE NUMBERS:
    8:00 AM–4:45 PM (810) 637-0400
    AFTER HOURS (810) 637-5210
PRODUCT CLASS: MANUFACTURER'S CODE IDENTIFICATION:
    PHENOLIC COATING    2BME45451
TRADE NAME:
    NYLON PRIMER

SECTION II - HAZARDOUS INGREDIENTS

| HAZARDOUS INGREDIENTS: | C.A.S. No. | "PCT" by Wt | TLV-TWA PPM MG/W3 | PEL-TWA PPM MG/W3 | Vapor Press |
| --- | --- | --- | --- | --- | --- |
| M-BUTYL ALCOHOL | 71-36-3*35-50 | Skin | 50.0000 | 100.0000 | 4.4 |
| 1-BUTANOL | | | 152.0000 | 300.0000 | |
| CRESTYLIC ACID (ISOMERS AND MIXTURE | 1319-77-3 | <5 Skin | 5.0000 | 5.0000 | .9 |
| CORESOL | | | 22.0000 | 22.0000 | |
| FORMALDEHYDE | 50-00-0 | <.5 | .3000 .3700 | .7300 | 0 9.5 |
| PHENOL CARBOLIC ACID | 106-95-2 | <5 Skin | 5.0000 19.0000 | 5.0000 19.0000 | NA |
| PROPYLENE GLYCOL METHYL ETHER ACETATE PM ACETATE | 108-65-6* | 5-20 | — | — | 3.8 |
| TITANIUM DIOXIDE | 13463-67-7* | 15-30 | — 10.0000 | — 15.0000 | NA |

SECTION III - PHYSICAL DATA

BOILING RANGE:    VAPOR DENSITY VS. AIR:
243–405 DEG. F.    HEAVIER THAN AIR
EVAPORATION RATE VS. ETHER:
SLOWER
PERCENT VOLATILE BY VOLUME:   WEIGHT PER GALLON:
62.3    9.46 LBS.

SECTION IV - FIRE AND EXPLOSION HAZARD DATA

TABLE B-continued

MATERIAL SAFETY DATA SHEET
DATE PRINTED: Dec. 15, 1996     $45451     IPL#     TO#20015

FLASH POINT:     LEL: 1.0
97F SFCC
OSHA CLASSIFICATION:

FLAMMABLE LIQUID - CLASS 1C
EXTINGUISHING MEDIA:

FOAM, CARBON DIOXIDE. DRY CHEMICALS
UNUSUAL FIRE AND EXPLOSION HAZARDS:

KEEP CONTAINERS TIGHTLY CLOSED. ISOLATE FROM HEAT, SPARKS, ELECTRICAL EQUIPMENT AND OPEN FLAME. CLOSED CONTAINERS MAY EXPLODE WHEN EXPOSED TO EXTREME HEAT.
APPLICATION TO HOT SURFACES REQUIRES SPECIAL PRECAUTIONS. DURING EMERGENCY CONDITIONS OVER EXPOSURE TO DECOMPOSITION PRODUCTS MAY CAUSE A HEALTH HAZARD. SYMPTOMS MAY NOT BE IMMEDIATELY APPARENT. OBTAIN MEDICAL ATTENTION.
SPECIAL FIRE FIGHTING PROCEDURES:

WATER MAY BE INEFFECTIVE. WATER SHOULD BE USED TO COOL CONTAINERS EXPOSED TO FIRE. FIRE FIGHTING PERSONNEL SHOULD WEAR SELF-CONTAINED BREATHING APPARATUS.

SECTION V - REACTIVITY DATA

STABILITY:

STABLE
INCOMPATIBILITY (MATERIALS TO AVOID):

NONE REASONABLY FORESEEABLE.
HAZARDOUS DECOMPOSITION PRODUCTS:

CARBON MONOXIDE, CARBON DIOXIDE, SMOKE, OXIDES OF NITROGEN.
HAZARDOUS POLYERIZATION:

WILL NOT OCCUR
CONDITIONS TO AVOID:

NOT APPLICABLE

SECTION VI - HEALTH HAZARD DATA

THRESHOLD LIMIT VALUE: SEE SECTION II.
EMERGENCY AND FIRST AID PROCEDURES:

INHALATION: MOVE TO FRESH AIR. GIVE ARTIFICIAL RESPIRATION IF NECESSARY.
SKIN CONTACT: WASH WITH SOAP & WATER.
EYE CONTACT: FLUSH WITH WATER FOR AT LEAST 15 MINUTES. CONSULT A PHYSICIAN.
INGESTION: DRINK ONE OR TWO GLASSES OF WATER TO DILUTE. DO NOT INDUCE VOMITING. CONSULT PHYSICIAN OR POISON CONTROL CENTER IMMEDIATELY. TREAT SYMPTOMATICALLY.
MEDICAL CONDITIONS PRONE TO AGGRAVATION:
NONE EXPECTED.
THE FOLLOWING HAZARDS HAVE BEEN REPORTED TO BE ASSOCIATED WITH THE INDIVIDUAL COMPONENTS OF THIS PRODUCT. THESE HAZARDS MAY NOT ALL BE ASSOCIATED WITH THE FINISHED PRODUCT.
ACUTE:

EXCESSIVE VAPOR CONCENTRATION IN AIR, ESPECIALLY IN CONFINED SPACES, MAY CAUSE ASPHYXIATION.
INHALATION OF VAPOR OR SPRAY MIST MAY BE FATAL.
EXCESSIVE INHALATION OF VAPORS CAN CAUSE NASAL, THROAT AND RESPIRATORY IRRITATION, DIZZINESS, WEAKNESS, FATIGUE, NAUSEA, HEADACHE AND POSSIBLE UNCONSCIOUSNESS.
INHALATION OF VAPOR AND SPRAY MIST MAY CAUSE NASAL, THROAT, AND RESPIRATORY IRRITATION, SEVERE CASES MAY RESULT IN FUNCTIONAL AND DESTRUCTIVE INJURY OF THE LIVER AND KIDNEYS.
INHALATION OF SPRAY MIST MAY CAUSE LUNG DAMAGE.
SANDING DUST OR DRY SPRAY MAY CAUSE IRRITATION TO THE RESPIRATORY SYSTEM.
LIQUID IS CORROSIVE TO THE EYES, EYE SPLASH MAY CAUSE BURNS AND PERMANENT EYE DAMAGE. VAPORS MAY CAUSE SEVERE EYE IRRITATION, REDNESS, TEARING, AND BLURRED VISION.
EYE CONTACT CAUSES IRRITATION, REDNESS, TEARING, BLURRED VISION, AND A SENSATION OF SEEING HALOS AROUND LIGHTS.
EYE CONTACT WITH LIQUID CAUSES SEVERE IRRITATION, REDNESS, TEARING, BLURRED VISION AND A SENSATION OF SEEING HALOS AROUND LIGHTS. VAPOR EXPOSURE MAY CAUSE EYE IRRITATION, REDNESS AND TEARING.
DRY DUST MAY CAUSE MECHANICAL EYE IRRITATION.
CORROSIVE TO THE SKIN, CONTACT MAY CAUSE SKIN BURNS.
MAY BE ABSORBED THROUGH THE SKIN IN TOXIC AMOUNTS CAUSING RESPIRATORY FAILURE AND DEATH.
PROLONGED SKIN CONTACT MAY LEAD TO EXTRACTION OF NATURAL OILS WITH RESULTANT DRY SKIN, CRACKING, IRRITATION AND DERMATITIS.
SKIN CONTACT MAY CAUSE IRRITATION, REDNESS AND ITCHING.
ACCUMULATION OF SANDING DUST OR DRY SPRAY OR SKIN MAY LEAD TO EXTRACTION OF NATURAL OILS WITH RESULTANT SKIN IRRITATION.
MAY BE ABSORBED THROUGH THE SKIN IN TOXIC AMOUNTS CAUSING RESPIRATORY FAILURE AND DEATH.
SWALLOWING MAY CAUSE GASTROINTESTINAL IRRITATING, NAUSEA, VOMITING AND DIARRHEA.
NOTICE: INTENTIONAL MISUSE BY DELIBERATELY CONCENTRATING AND INHALING THE CONTENTS MAYBE HARMFUL OR FATAL. REPORTS HAVE ASSOCIATED REPEATED AND PROLONGED OCCUPATIONAL OVEREXPOSURE TO SOLVENTS WITH PERMANENT BRAIN AND NERVOUS SYSTEM DAMAGE.
CHRONIC:

FORMALDEHYDE IS LISTED BY OSHA AS A POTENTIAL CANCER HAZARD, AGAIN AS A SUSPECTED HUMAN CARCINOGEN (A2), HTP AS REASONABLY ANTICIPATED TO BE A CARCINOGEN AND IARC AS PROBABLY CARCINOGENIC TO HUMANS (GROUP 2A).
HEALTH STUDIES HAVE SHOWN THAT MANY PETROLEUM HYDROCARBONS POSE POTENTIAL HUMAN HEALTH RISKS WHICH MAY VERY FROM PERSON TO PERSON. AS A PRECAUTION, EXPOSURE TO LIQUIDS AND VAPORS SHOULD BE MINIMIZED.
PROLONGED OR CONTINUOUS OVEREXPOSURE TO VAPORS MAY RESULT IN HEARING DISORDERS.
REPEATED INHALATION OF VAPOR OR SPRAY MIST, OR REPEATED SKIN CONTACT MAY CAUSE DIGESTIVE DISTURBANCES, NERVOUS DISORDERS, SKIN ERUPTIONS, LIVER AND KIDNEY DAMAGE WITH RESULTANT DEATH.
REPEATED OR PROLONGED INHALATION OF VAPOR OR SPRAY MIST, EVEN AT LOW DOSES, MAY CAUSE REDUCED PULMONARY FUNCTION.
PROLONGED AND CONTINUOUS EXPOSURE TO AN EXCESSIVE CONCENTRATION OF DUST OF ANY KIND MAY HAVE AN ADVERSE PULMONARY EFFECT ON SOME PEOPLE.

SECTION VII - SPILL OR LEAK PROCEDURES

STEPS TO BE TAKEN IN CASE MATERIAL IS RELEASED OR SPILLED:

REFER TO PROTECTIVE MEASURES LISTED IN SECTIONS IV., V., VI., VIII. AND IX. REMOVE ALL SOURCES OF IGNITION.
AVOID BREATHING VAPORS. VENTILATE AREA. REMOVE WITH INERT ABSORBENT
WASTE DISPOSAL METHOD:

INCINERATE IN AN APPROVED FACILITY, DO NOT INCINERATE CLOSED CONTAINERS. DISPOSE OF IN ACCORDANCE WITH

TABLE B-continued

MATERIAL SAFETY DATA SHEET
DATE PRINTED: Dec. 15, 1996     $45451     IPL#    TO#20015

FEDERAL, STATE AND LOCAL POLLUTION CONTROL REQUIREMENTS.

SECTION VIII - SAFE HANDLING AND USE INFORMATION

RESPIRATORY PROTECTION:

ADEQUATE VENTILATION IS REQUIRED. USE NIOSH/NSHA APPROVED RESPIRATOR DEVICE. SEE YOUR SAFETY EQUIPMENT SUPPLIER FOR EVALUATION AND RECOMMENDATION. IN CONFINED AREAS USE NIOSH/NSHA APPROVED AIRLINE RESPIRATOR OR HOOD
VENTILATION:

PROVIDE SUFFICIENT VENTILATION TO KEEP VAPOR CONCENTRATION BELOW THE GIVEN TLV AND LEL. FOR BAKING FINISHES, EXHAUST VAPORS EMITTED ON HEATING. REMOVE DECOMPOSITION PRODUCTS FORMED DURING WELDING OR FLAME CUTTING OR SURFACES COATED WITH THIS PRODUCT.
PROTECTIVE GLOVES:

REQUIRING FOR PROLONGED OR REPEATED CONTACT. REFER TO SAFETY EQUIPMENT SUPPLIER FOR EFFECTIVE GLOVE RECOMMENDATIONS.
EYE PROTECTION:

USE SAFETY EYE WEAR DESIGNED TO PROTECT AGAINST SPLASH OR LIQUIDS.
OTHER PROTECTIVE EQUIPMENT:

EYE BATH AND SHOWER SHOULD BE AVAILABLE. USE CHEMICAL RESISTANT APRON, BOOTS OR OTHER CLOTHING IF NEEDED TO AVOID REPEATED OR FREQUENT SKIN CONTACT. LIQUID MAY PENETRATE SHOES AND LEATHER CAUSING DELAYED IRRITATION.
HYGIENIC PRACTICES:

WASH HANDS BEFORE EATING, SMOKING OR USING WASHROOM.

SECTION IX - SPECIAL PRECAUTIONS

PRECAUTIONS TO BE TAKEN IN HANDLING AND STORING:

STORE CONTAINERS OUT OF SUN AND AWAY FROM HEAT, SPARKS AND OPEN FLAMES.
CLOSE CONTAINERS AFTER EACH USE. CONSULT N.F.P.A. CODE FOR ADDITIONAL STORAGE REQUIREMENTS.
OTHER PRECAUTIONS:

DO NOT TAKE INTERNALLY. USE APPROVED BONDING AND GROUNDING PROCEDURES.
OBSERVE LABEL PRECAUTIONS. KEEP CLOSURES TIGHT AND CONTAINER UPRIGHT TO PREVENT LEAKAGE.
NEVER USE PRESSURE TO EMPTY - DRUM IS NOT A PRESSURE VESSEL. AVOID BREATHING SANDING DUST. DO NOT WELD OR FLAME OUT AN EMPTY DRUM. DO NOT HANDLE UNTIL THE MANUFACTURER'S SAFETY PRECAUTIONS HAVE BEEN READ AND UNDERSTOOD.
APPROVED BY RAW MATERIAL AND FORMULA INFORMATION DEPARTMENT DATE: Apr. 29, 1997

TABLE C

Creanova
Engineering Plastics
January 1998
VESTAMID ® coated steel tubing processing recommendations Material VESTAMID X 1377 black 9.7504 (lower viscosity): 210–230° C. (410–445° F.) melt temperature

TABLE C-continued

Creanova
Engineering Plastics
January 1998
VESTAMID ® coated steel tubing processing recommendations VESTAMID LX 9001 black 9.7504 (higher viscosity): 210–240° C. (420–465° F.) melt temperature
Tubing treatment Chromate application:
as thin as possible - because the chromate layer has no mechanical strength
as thick as necessary - to be sure that the whole surface is treated (additional primers or conditioning are not necessary)
Tubing temperature 230–280° C. (446–535° F.) via induction heating
(blistering in the plastic must be avoided)
Cross head conditions Draw down ratio of 1.5:1 to 2:1
A vacuum should be applied between the steel tube and the PA 12 to enhance the application of the melt to the steel.
Downstream conditions Distance between cross head die and water tank may vary. The outer PA 12 surface and the adhesion of the PA 12 to steel may both be contingent on this distance, in relation to line speed & temperatures.
Additional items of note The cross head application of PA 12 to the tube is recommended as soon as possible after the tubing is chromated. (Optimum would be to have the chromate treatment in line with the extrusion coating)

TABLE D

| | |
|---|---|
| CRENOVA INC. | 24 Hour Emergency Number: 800-424-9300 |
| | 24 Hour CHEMTREC Number: 800-424-9300 |
| Approval Date: | Nov. 8, 1996    Cust: 30158042 |
| Print Date: | Feb. 16, 1999    MSDS Number: 1300167 01-08 |

1. CHEMICAL PRODUCT AND COMPANY IDENTIFICATION

Product Name: VESTAMID - X 7377 BLACK 9.7504
    Supplier/Manufacturer:
    CRENOVA Inc.
    Turner Place, Box 365
    Piscataway, NJ 08855
    Environmental & Regulatory Affairs, Information Number:
    908-981-5016
2. COMPOSITION/INFORMATION ON INGREDIENTS This product does not contain any components considered to be health hazards under the OSHA Hazard Communication Standard 29 CFR 1910.1200 or under the WHMIS Controlled Product Regulations in Canada.
3. HAZARDS IDENTIFICATION

*EMERGENCY OVERVIEW*
Fumes from hot processing may be irritating to eyes and respiratory tract.
POTENTIAL HEALTH EFFECTS
Eye Contact:
Fumes from hot processing may cause eye irritation.
Skin Contact:
No hazard expected in normal use.
Inhalation:
Fumes from hot processing may cause irritation.
Ingestion:
Not applicable; not an expected route of exposure.
4. FIRST AID MEASURES FIRST AID
Eye Contact:
In case of contact, immediately flush eyes with plenty of TABLE D-continued

| CRENOVA INC. | 24 Hour Emergency Number: 800-424-9300 |
| --- | --- |
| | 24 Hour CHEMTREC Number: 800-424-9300 |
| Approval Date: | Nov. 8, 1996   Cust: 30158042 |
| Print Date: | Feb. 16, 1999   MSDS Number: 1300167 01-08 | water. Obtain medical attention if irritation develops or persists.
Skin Contact:
Wash with water. For hot product, immediately immerse or flush the affected area with large amounts of cold water to dissipate heat. Cover with clean cotton sheeting or gauze and get prompt medical attention. No attempt should be made to remove material from skin or to remove contaminate clothing as the damaged flesh can be easily torn.
Inhalation:
In case of exposure to fumes from hot processing, remove victim to fresh air. If not breathing, give CPR. If breathing is difficult, give oxygen. Get medical attention.
Ingestion:
Not applicable: not an expected route of exposure.

5. FIRE FIGHTING MEASURES

Flash point: not applicable     Lower Explosive Limit    Not applicable
Flash point Method:             Upper Explosive Limit    Not applicable
not applicable
OSHA flammability Classification:    Autoignition Temperature: >350
None
Other Flammable Properties:
Dusts at sufficient concentrations can form explosive mixtures with air.
Extinguishing Media:
Use water spray or fog, foam, dry chemical or C02.
Fire Fighting Procedures:
As in any fire, wear self-contained positive-pressure breathing apparatus, (MSHA/NIOSH approved or equivalent) and full protective gear.

6. ACCIDENTAL RELEASE MEASURES

Steps to be taken in case material is released or spilled:
Allow molten material to solidity and scrape up. Collect material and place in a disposal container. Obey relevant local, state, provincial and federal laws and regulations. Do not contaminate any lakes, streams, ponds, groundwater or soil.

7. HANDLING AND STORAGE

Handling:
Use with adequate ventilation. Avoid breathing vapors from heated material.

8. EXPOSURE CONTROLS/PERSONAL PROTECTION

This product does not contain any components considered to be health hazards under the OSHA Hazard Communication Standard 29 CFR 1910.1200 or under the WHMIS Controlled Product Regulations in Canada.
Engineering Controls:
Use adequate ventilation.
Respiratory Protection:
In case of exposure to fumes in hot processing, use appropriate NIOSH-approved respiratory protective equipment.
Eye Protection:
Wear safety glasses with side shields.
Skin Protection:
Use impermeable gloves.
Other Protective Equipment:
To identify additional Personal Protective Equipment (PPE) requirements, it is recommended that a hazard assessment in accordance with the OSHA PPE Standard (29CFR1910.132) be conducted before using this product.

9. PHYSICAL AND CHEMICAL PROPERTIES

| Vapor Pressure | Not applicable |
| --- | --- |
| Vapor Density (Air = 1) | Not applicable |
| Specific Gravity | 1.0–1.2* |
| Boiling Point | Not available |
| Melting Point | 80 to 220° C.* |
| pH | Not available |
| Evaporation Rate | Not applicable |

Other Properties:
Granulate. Odorless. Solubility in water Negligible. (*) = This information applies to a group of products. The data for this specific grade can be obtained from the Product Information Sheet.

10. STABILITY AND REACTIVITY

Stability:
This product is stable under normal storage conditions.
Hazardous Polymerization:
Will not occur under normal conditions.
Conditions to Avoid:
Operations that create dust.

11. TOXICOLOGICAL PROPERTIES

Other Toxicological Information:
The toxicological properties of this product have not been fully investigated.

12. ECOLOGICAL INFORMATION

Ecological Information:
No information available.

13. DISPOSAL CONSIDERATIONS

Disposal Method:
Incinerate. Follow all federal, state, and local regulations.

14. TRANSPORTATION INFORMATION

U.S. DOT Transport Information
Proper Shipping Name: Not regulated

15. REGULATORY INFORMATION

This product contains the following non-hazardous components:
CAS Number    wt. %
Azacyclotridecan-2-one, homopolymer 025038-74-8    94
NJTSR No. 5605700001-5190P            Trade Secret    5
U.S. Federal Regulations
OSHA:
This document has been prepared in accordance with the MSDS requirements of the OSHA Hazard Communication Standard.
Clean Air Act Section 112:
This product contains the following components listed as Hazardous Air Pollutants:
None.
This product contains the following components listed as Extremely Hazardous Air Pollutants:
None.
SARA Section 311/312:
Hazard Classification: None
SARA Section 313:
This product contains the following substances subject to the reporting requirements of Section 313 of Title III of the Superfund Amendments and Reauthorization Act of 1986 and 40 CFR Part 372:
None
TSCA:
This product or its components are listed in or exempt from TSCA inventory requirements.
This product contains the following non-proprietary substances subject to export notification under Section 12(b) of TSCA:
None
State Regulations
New Jersey:
This product contains the following non-hazardous components subject to disclosure under New Jersey Right-To-Know legislation:
                                                    CAS Number
Azacyclotridecan-2-one, homopolymer        025038-74-8
NJTSR No. 56705700001-5190P              Trade Secret
Pennsylvania:
This product contains the following non-hazardous components subject to disclosure under Pennsylvania Right-To-Know legislation:
                                                    CAS Number
Azacyclotridecan-2-one, homopolymer    025038-74-8
NJTSR No. 56705700001-5190P            Trade Secret

TABLE D-continued

| CRENOVA INC. | 24 Hour Emergency Number: 800-424-9300 |
|---|---|
| | 24 Hour CHEMTREC Number: 800-424-9300 |
| Approval Date: | Nov. 8, 1996  Cust: 30158042 |
| Print Date: | Feb. 16, 1999  MSDS Number: 1300167 01-08 |

Massachusetts:
This product contains the following substances on the
Massachusetts Substance List:
None
California (Proposition 65):
This product contains the following substances known to
the State of California to cause adverse reproductive effects:
None
International Regulations
Summary of International Chemical Inventory Status

| Canada | On inventory |
|---|---|
| Europe | On inventory |
| South Korea | Not on inventory |
| Australia | On inventory |

16. OTHER INFORMATION

| HMIS Ratings: | Health - 1  Flammability - 1 Reactivity - 0 |
|---|---|
| Ratings Key: | 4 = Highest hazard, 0 = Lowest hazard, |
| | * = Chronic health hazard, N = No rating for powders |
| NFPA Ratings: | Health - 1  Flammability - 1 Reactivity - 0 |
| Ratings Key: | 4 = Highest hazard, 0 = Lowest hazard, |
| | N = No rating for powders |

Key to abbreviations used:

| NA | Not applicable |
|---|---|
| NAV | Not available |
| NE | Not established |
| NJTSR No. | New Jersey Trade Secret Registry Number |
| ® | Registered Trademark owned by or | licensed to CREANOVA Inc., CREANOVA Canada Inc.,
CREANOVA Spezialchemie GmbH, or Röhm GmbH.
™ Trademark owned by or licensed to CREANOVA
Inc., CREANOVA Canada Inc., CREANOVA Spezialchemie
GmbH, or Röhm GmbH.
Revision Summary
The following MSDS sections were revised since the previous
version Mar. 17, 1995:
Color number added to name
Sections 5, 9 and 10: General dust precautions added.
The information is furnished without warranty, representation,
inducement, or license of any kind, except that it is accurate to the
best of CRENOVA Inc.'s knowledge or obtained from sources
believed by CREANOVA Inc. to be accurate and CREANOVA Inc.
does not assume any legal responsibility for use or reliance on
same. Customers are encouraged to conduct their own tests. Before
using any product, read its label.
MSDS last page

TABLE E

COATINGS FOR STEEL TUBING 1.0 GENERAL
1.1 Purpose of the Standard
This standard outlines the requirements for coatings applied to the outside and tide diameter of steel tubing. The coatings are applied to the outside diameters of double wall brazed thing (MS-1806) or single wall welded tubing (MS-3236). This standard defines the coating requirement for cases requiring greater internal corrosion resistance than carbon steel and approaching the corrosion resistance of austenitic stainless steel.
1.2 Purpose of The Process

TABLE E-continued

COATINGS FOR STEEL TUBING

The purpose of the process is to define the parameters of material application and thickness to achieve the corrosion resistance required. A classification of the various coatings is described in Table 1. Coating I offers superior corrosion and abrasion resistance over Coatings II. Coatings I and II shows improved corrosion resistance over Coatings III, IV and V and VI. Both coatings V and VI containing Lead Tin are being phased out over the next few years. Coating V used in non-abrasive areas of some passenger car platforms for brake line applications and for fuel lines in passenger cars, jeep and truck. Coating V, a duplex coating of zinc rich with the heavier Tin Lead Coating, is often used with a mechanical abrasion resistant zinc coated (PS-77) steel wire cover or other protective covering for brake lines. The heavier Lead Tin Coating - 49 $g/m^2$ for brake lines, for fuel lines - 18 $g/m^2$ are being replaced by hot dipped zinc aluminum alloy or electroplated zinc. A comparison summary of the various corrosion resistant properties and coating thicknesses are shown in Table 2.
Aluminum coated armor wire with a minimum coating weight of 60 $g/m^2$ per ASTM A 764 Type A is used as a further protection for stone abrasion. Armor is expected to be superior to shrink wrap for use in abrasion resistance protection for Coating I should it be required. The melt point of Coating I Polyamide 12 coating is approximately 177 Degrees C. (350 Degrees F.). The general operating temperature for Nylon 12 is 149 Degrees C. (300 Degrees F.). The safe operating temperature for the zinc aluminum alloy is approximately 250 Degrees C. (482 Degrees F.). The aluminum rich coating is cured at 254 degrees C. to 275 degrees C. (490 degrees F. to 527 degrees F.). The polyvinylidene or poly vinyl fluoride coating is cured at 240 degrees C. (464 degrees F.). The zinc chromate coating is cured at 190 degrees C. (375 degrees F.).

TABLE 1

CLASSIFICATION OF VARIOUS EXTERNAL COATINGS AVAILABLE (See para 1.3.1-Designation Codes)

| COATING | CODE | DESCRIPTION |
|---|---|---|
| I | LZ | Hot dipped zinc alloy coating followed by an extruded polyamide Nylon 12 coating. |
| II | PE, VE | Electroplated zinc coating or hot dipped zinc alloy coating, followed by a poly vinyl fluoride or polyvinylidene fluoride coating |
| III | AZ | Hot dipped zinc alloy coating followed by an aluminum rich-organic coating |
| IV | NZ | Hot dipped zinc alloy |
| V | CT, CH | A duplex coating consisting of a led tin alloy coating followed by an organic coating containing chromates and zinc particles formerly PS-7069 |
| VI | NT, NH | A hot dipped lead tin coating formerly PS 954 |

TABLE 2

SUMMARY AND COMPARISON OF VARIOUS EXTERNAL
COATINGS AND THEIR CORROSION REQUIREMENTS

| COATING | CODE | DESCRIPTION | CORROSION RESISTANCE | THICKNESS OUTER/INNER |
|---|---|---|---|---|
| I | LZ | Extruded polyamide Nylon 12 polyamide over hot dipped zinc aluminum alloy coating | Paragraph 5.1 A) 2000 hours knife cut salt spray ASTM B117. No lifting or delamination of coating. Red rust is allowed only at knife cut. B) Fuel Soak Testing 500 hours ascribed and not scribed per 5.1.B. C) Gravelometer −18 Deg C. (0 Deg F.) SAE J400 5 pints, 1500 hours ASTM B-117. No lifting or delamination of coating. Red rust is allowed only at gravel impacted area; 5% of impacted areas, maximum. D) Gravelometer and cyclic salt spray ASTM B-117 5, 5, 5, 6, pints, 400 hours. No lifting or delamination of coating. Red rust is allowed only at gravel impacted area; 10% of the impacted areas, maximum. E) 170 cycles burst 13,789 kPa (2000 psi) minimum for Brakelines, Functional for fuel lines, power steering and transmission all cooler lines. | Paragraph 4.1 Nylon: 0.170 mm (0.0067 inch) minimum per ASTM B 487. 4.2B Zinc 5% Aluminum alloy 5.2 microns (0.0002 inch), 36 g/meter squared minimum per ASTM A 90. |
| II | PE, VE | Polyvinyl fluoride or polyvinylidene fluoride coating over electroplated zinc. | Paragraph 5.2 A) 400 hours knife cut salt spray ASTM B-117 B) Gravelometer −18 Deg C. (0 Deg F.) 1 pint 1000 hours no red rust at gravel impacted areas | Paragraph 4.2 B and C Fluoride coating 10 microns (.0004 inch minimum per ASTM B 487: Electroplated zinc 25 microns (0.001 inch) minimum for MS-1808 and 13 microns (.0005 inch for MS 3235. minimum coating 180 g/meter squared and 90 g/meter squared per ASTM A 90 FOR ms-1806 and MS-3235 respectively. |
| II | PZ, VZ | Polyvinyl fluoride or polyvinylidene fluoride coating over hot dipped zinc aluminum alloy. | Paragraph 5.2 A) 400 hours knife cut salt spray ASTM B117 B) Gravelometer −18 Deg C. (0 Deg F.) SAE J400 1 pint and salt spray per ASTM B-117 shall meet 1000 hours with no red rust. | Paragraph 4.2C A Fluoride coating 10 micros (.0004 inch) minimum per ASTM B 487. 4.2B Zinc aluminum alloy 5.2 microns (.0002 inch), 36 g/meter squared per minimum per ASTM A 90 |
| III | AZ | Aluminum Rich over hot dipped zinc aluminum alloy | Requirements to Paragraph 5.2A B above. Paragraph 5.2C 360 hours salt spray per ASTM B-117 no more than 1% red rust over any 25.4 mm (1 inch) length compared to ASTM D 610, Plate 6 | Paragraph 4.3C Aluminum rich coating 8 g/meter squared (.026 oz/square foot). Paragraph 4.2B Zinc aluminum alloy 5.2 microns (.0002 inch), 36 g/meter squared per minimum per ASTM A 90 |
| IV | NZ | Hot dipped zinc aluminum alloy | Paragraph 5.2C 380 hours salt spray per ASTM B-117 no more than | Paragraph 4.2B 5.2 microns (.0002 inch) minimum per |

TABLE 2-continued

SUMMARY AND COMPARISON OF VARIOUS EXTERNAL
COATINGS AND THEIR CORROSION REQUIREMENTS

| COATING | CODE | DESCRIPTION | CORROSION RESISTANCE | THICKNESS OUTER/INNER |
|---|---|---|---|---|
| V | CT, CH | Zinc chromate over hot dipped lead tin alloy | 1% red rust over any 25.4 mm (1 inch) length compared to ASTM D 610, Plate 6 Paragraph 5.3A 200 hours resistance to red rust and shall show no more than 1 base metal corrosion 1.5 mm (.080 inch) in diameter or larger in any area 500 square millimeter (.77 square inch) when tested per ASTM B-117 | ASTML B 487 Coating coverage minimum 36 g/meter squared per ASTM A 90 Paragraph 4.4D 15 g/meter squared (05. Oz/square foot) minimum organic zinc chromate Paragraph 4.4B. 31 g/meter squared led-tin over MS-1806 tubing or 18 g/meter squared (.06 oz/square foot) per ASTM A 309 over MS-3225 tubing. |
| VI | NT, NH | Hot dipped lead tin alloy | No requirements. Less than 24 hours in salt spray to red rust per ASTM B 117 (Engineering Reference Characteristic). | Paragraph 4.5 49 g/meter squared lead-tin (0.16 oz/square foot) per LP-481H-102 applied over MS-1806 tubing and 18 g/meter squared (0.06 oz/square foot) per LP-461H-102 applied to MS-3235, ASTM A 309. |

1.3 Coverage of this Standard

This standard describes the methods for corrosion protection of tubing used for automotive brake and fuel lines, transmission oil cooler lines, and power steering lines. The engineering coating designation codes, process for applying the coatings, requirements of appearance, coating weight and thickness of the individual coatings, and the corrosion resistance from the combination of coatings are defined.

1.3.1 Coating Designation Codes***

Any requirements shown on the part drawing shall take precedence over the requirements specified in this standard. The following codes shall be applied to the engineering part drawing.

Coating Designation PS-8688 XY:
X—First Letter, Outer Coating;
P—Polyvinyl Fluoride—PVF
V—Polyvinylidene Fluoride—PVDF
A—Aluminum Rich Organic
C—Zinc Rich, Chromate Organic
N—No Top Coating
L—Nylon 12 Polyamide
Y—Second Letter, Inner Coating:
E—Electroplated Zinc—
Z—Zinc 5% Aluminum Alloy-Hot Dipped
T—Lead-Tin Alloy Hot Dipped—18 g/m$^2$
H—Lead-Tin Alloy Hot Dipped—49 g/m$^2$
Z—Third letter, Coating applied to Inside Diameter of Single Wall Electric Welded Tubing (Third letter is only used to specify requirements for ID coating, such as nickel plated coating. When a third letter is not used, an ID coating is not specified).
N—Nickel Electroplate ID Tubing, 3.8 microns minimum (0.000 150 inch)
U—Uncoated
C—Copper Electroplate, 3.8 microns minimum (0.000150 inch) on both surfaces For example:
PS-8688 AZ: Designates an aluminum rich coating applied to a zinc aluminum alloy coated tubing.
PS-8888 LZ: Designates an extruded Nylon 12 polyamide coating applied to a zinc aluminum coated tubing.
PS-8688 NH: Designated a Terne coat over the tubing and no topcoat over the Terne. Coating weight of lead-tin alloy is 459 g/m$^2$.
PS-8688 PZ: Designates a polyvinyl fluoride coating applied over a zinc aluminum alloy coating tubing.
PS-8688 CH: Designates zinc rich organic, chromate coating applied to a lead-tin alloy coating. The coating weight for the lead-tin is 49 g/m$^2$.
PS-8688 LZN: Designates an extruded Nylon 12 polyamide coating applied to a zinc aluminum coated tubing. The ID of the tubing is coated with a deposit of 3.8 microns minimum of nickel electroplate.
PS-8688 PEN: Designates a Polyvinyl Fluoride over electroplated zinc on the outside diameter and 3.8 microns minimum of electroplated nickel applied to the inside diameter of the tubing.

2.0 Coating Procedures***

The processes utilized in this specification are referenced here and in the sections referenced.
Zinc-Electroplated (PS-73) per Paragraph 3.1
95% Zinc-5% aluminum alloy hot dip per Paragraph 2.1 (Table 3, Paragraph 3.2)
Dichromate Conversion Treatment (PS-1207) per Paragraph 3.3
Fluoride Coating per Paragraph 3.4
Nylon—Nylon 12 Polyamide per Paragraph 3.5

Nickel Electroplate (ASTM B689-90) per Paragraph 3.6
Aluminum Rich organic coating per Paragraph 3.7
Organic coating containing chromates and zinc particles per Paragraph 3.8
Lead-tin alloy coating per Paragraph 3.9
Appearance, Coating, Weight, and Thickness of the Coatings and defined in the section 4.
Corrosion is specified in section 5.

3.0 Process 3.1 Zinc or Zinc Aluminum Alloy Coating Process

Zinc electroplating shall be in accordance PS-79. The zinc aluminum alloy hot dip coating process shall use a 95% zinc—5% aluminum alloy per paragraph 3.2 (Table 3).

3.2 Zinc-Aluminum Alloy

TABLE 3

ZINC ALUMINUM ALLOY COATING CHEMISTRY (INCOMING INGOT), PERCENT

| | |
|---|---|
| Aluminum | 4.7–5.2 |
| Lanthanum | 0.02–0.05 |
| Cerium | 0.01–0.04 |
| Others - each | 0.005 max. |
| Zinc | Remainder |

3.3 Chromate Conversion Treatment

Following the zinc electroplating coating Process 3.1 the surface shall be olive drab chromate chemical conversion treated per PS-1207. Following the zinc aluminum alloy coating process 3.2 an optional chromate chemical treatment per PS-1207 is permissible.

3.4 Fluoride Coatings

A fluoride coating shall be applied to the outside diameter of the tubing. Either the polyvinyl fluoride or the polyvinylidene fluoride coating is to be used as a top coating. The top coatings are applied over zinc or zinc aluminum alloy coatings.

3.5 Nylon Coating***

The nylon polyamide 12 coating shall be applied to the outside diameter of the tubing. It shall be used as the top coating. The Nylon 12 is extruded over the zinc aluminum alloy Paragraph 3.2 (Table 3) coated tubing. Prior to the extrusion of Nylon 12, an application of the primer shall be used to promote adhesion and corrosion resistance of the tubing.

3.6 Nickel Coating***

The nickel coating is used for LZN or PEN or AZN. The nickel coating shall be applied to the inside diameter of the tubing. The nickel coating is electro deposited per ASTM B689-90 to the low carbon steel substrate. The nickel coating shall be free from pits or blisters. The strip shall withstand a 180 degrees bend over a radius equal to twice the thickness of the strip and return without showing any peeling or lifting of the nickel when examined under a 10× magnification. Minimum thickness is 3.8 microns (0.000150 inch) free or diffused Nickel. Nickel reflows over the resistance tube weld to maintain exceptional corrosion resistance at the inside diameter.

3.7 Aluminum—Rich Organic Coating

The aluminum rich organic coating shall be applied to the outside diameter of the zinc aluminum alloy Paragraph 3.2 (Table 3) coated tubing. The tubing shall be baked to cure the aluminum rich organic coating.

3.8 Organic Zinc Chromate Coating Process

The coating consisting of zinc particles, chromates, and organic material shall be applied to the outside diameter of the tubing. The tubing shall be baked to cure this organic coating to a coverage of Paragraph 4.4D.

3.9 Lead-Tin Alloy Coating Process

The coating shall be applied to the outside diameter of the tubing. The tubing shall be cleaned and immersed in a fluxing solution. Then the tubing shall be immersed in a molten bath of lead-tin alloy which contains a minimum of the percent tin as defined in Paragraph 4.4.C. The coated tubing shall be washed as required to remove any residual flux.

4.0 Quality (Appearance, Coating Weight, and Thickness of Coating 5)<S>***

4.1 Nylon 12 Polyamide Coating over Zinc-Aluminum Alloy or Nylon 12 Polyamide coating over Zinc-Aluminum coating applied to Nickel ID coated tubing.

A. Color shall be black unless otherwise specified.

B. Thickness and coating coverage of zinc-alloy coating paragraph 4.2.B. The minimum coating coverage of the nickel ID coating per paragraph 2.6.

C. The minimum coating coverage of the Nylon 12 polyamide coating is 0.17 mm (0.0067 inch) minimum and shall meet the OD requirements of Table 4.

TABLE 4

MAXIMUM ALLOWABLE OUTER DIAMETER FOR THE COATED TUBE FOR A GIVEN TUBE SIZE <S>

| TUBE SIZE, NOMINAL | COATED TUBE O.D., MAX. |
|---|---|
| 4.76 mm | 5.28 mm |
| 6.00 mm | 8.52 mm |
| 6.35 mm | 8.87 mm |
| 7.94 mm | 8.46 mm |
| 8.00 mm | 8.52 mm |
| 9.53 mm | 10.05 mm |
| 10.00 mm | 10.52 mm |
| 11.11 mm | 11.65 mm |
| 12.70 mm | 13.24 mm |
| 14.29 mm | 14.83 mm |
| 15.88 mm | 16.42 mm |

4.2 Fluoride Coating over Zinc or Zinc Aluminum Alloy

A. Color shall be black or olive drab unless otherwise specified on the engineering drawing.

B. The thickness of the electroplated zinc is 0.001 inch (25 microns) minimum for MS-1806 0.0005 inch (13 microns) for MS-3235. The minimum coating coverage is 180 g/m$^2$ and 90 g/m2 for MS-1806 and MS-3235 respectively. For the Zinc 5% Aluminum Alloy coating, the minimum average thickness is 0.0002 inch (5.2 microns); the minimum coating coverage is 38 g/m$^2$ per ASTM A 90. <S>

C. The thickness of the fluoride coating is 0.0004 inch (10 microns) minimum per ASTM B487.

4.3 Aluminum Rich Organic Coating Over Zinc-Aluminum Alloy.

A. Color shall be silver-grey unless otherwise specified.

B. Thickness and coating coverage of zinc-alloy coating paragraph 4.2.B.

C. The minimum coating coverage of the aluminum rich organic coating is 8 g/m$^2$ (0.028 oz/ft.2) per ASTM A 90.

4.4 Duplex—Organic Coating Containing Zinc And Chromate Particles Applied to A Lead-Tin Alloy Coating.

A. Color—The color shall be grey or green unless otherwise specified.

B. The minimum coating coverage is 31 g/m2 (0.10 oz/ft$^2$) for the lead-tin coating applied to MS-1806 double wall brazed tubing. The minimum coating coverage is 18 g/m$^2$ (0.06 oz/ft$^2$) for lead tin coating applied to MS-3235 electric resistance welded tubing per ASTM A 309, LP-461H-102.

C. The composition of the lead-tin alloy shall consist of 12% minimum tin and balance lead for coating applied over MS-1806 double wall brazed tubing and 7% minimum tin and balance lead for coating over MS-3235 single wall tubing.

D. The minimum coating coverage of the organic zinc chromate coating is 15 g/m² (0.05 oz/ft.2A) per ASTM A 90.

E. The coating shall be free of bare spots visible to the unaided eye.

4.5 Lead-Tin Coated Only Parts

Lead Tin requirements to paragraph 4.4.B except the minimum coating coverage is 49 g/m² (0.18 oz/ft²) for the lead tin coating applied to (MS-1808) double brazed tubing. The minimum coating coverage is 18 g/m² (0.6 oz/ft²) for lead tin coating applied to MS-3235 electric resistance welded tubing per ASTM A 309, LP-461H-102.

4.6 Workmanship

The final coating shall be smooth, even, and free from cracks, blisters, pinholes, modules and other harmful defects. Coverage shall be uniform in appearance and complete.

4.7 Adhesion and Ductility

The zinc or zinc alloy or lead-tin alloy shall have good adhesion to the substrate and to itself, and show no tendency toward flaking or peeling when tested in accordance with ASTM Standard Test Method B 671.

Make a cross cut pattern on the coating to the tubing then take test over the cross cut. Check for any separation of the nylon or fluoride or aluminum rich organic or zinc rich organic coating.

4.8 Ferroxyl Test

The tin-lead alloy coated tubing shall be free from uncoated spots. Any uncoated areas which are visible to the unaided eye at normal reading distance shall be considered unsatisfactory and sufficient cause for rejection. The presence of unreacted areas may be verified by the Ferroxyl Test, Chrysler Laboratory Procedure 461 H-80.

5.0 Corrosion Resistance***

5.1 Nylon 12 over Hot Dipped Zinc Aluminum Alloy

A. Tubing shall show no lifting or determination of coating; red rust is allowed only at knife cut after 2000 hours per ASTM B-117.

B. The OD tube coating shall show no lifting or determination when cut and peel tested after fluid cooks in Table 5, shown below, for 500 hours. After soak testing, cut and peel test by scribing two longitudinal knife cuts at 0.093 inch (2.3 mm) separation and cutting at 90 degrees to effect a tub start section of Nylon 12 coating. After testing in fluid soaks per Table 5, Nylon 12 may lift when pulled for less than 0.35 mm (0.25 inches) and then tear. No adhesive failure to these metal in permissible. Cohesive failure thru primer is acceptable.

Evaluation of ID corrosion for coating such as Nickel plating at 3.8 microns (0.00015 inch) minimum thickness after soak per Table 5 for 500 hours shall show no red rust or pitting after 500 hours exposure in soak fuels referenced in Table 5.

TABLE 5

SOAK FLUID FOR TESTING NYLON 12 ADHESION OR ID CORROSION

1. California Phase 2 Reformulated Gasoline per MS-9368
2. 500 ppm (0.05%) Sulfur as DTBS - Ditertiary Butyl DiSulphide added to MS-9368
3. Distilled Water
4. RFG + Butyl peroxide lauroyl peroxide (2.6 ml Butyl hydro peroxide per liter of RFG per MS-9368 or 10.4 ml Lauroyl peroxide per liter of RFG per MS-9368)

TABLE 5-continued

SOAK FLUID FOR TESTING NYLON 12 ADHESION OR ID CORROSION

5. $U_L$ gas per MS-8004 Certification Grade + 22% aggressive ethanol (Refer to Notes 1 and 2).
6. $U_L$ gas per MS-8004 Certification Grade + 85% aggressive ethanol (Refer to Notes 1 and 2).
7. $U_L$ gas per MS-8004 Certification Grade + 50% aggressive ethanol (Refer to Notes 1 and 2).
8. MS-4957 Calibration Fluid
9. Leaded gasoline - indolence 30 or MS-8004 with 3 grams per gallon lead
10. Fuel C (50% iso octane, 50% toluene)
11. TF2 (Dupont Waiver Fuel) (Refer to Note 3)
12. MS-9448 high cetane diesel fuel with 0.2% sulfur by weight
13. MS-9448 high cetane diesel fuel-highly paraffinic, >90% parraffin, >55 CN
14. MS-9448 high cetane diesel fuel-highly aromatic-made with highly aromatic cycle oil > 50% aromatic, >55 CN, 0.15% organic cetane improver
15. MS-high cetane diesel fuel-highly aromatic-as above with 2% by volume aggressive water.
16. Biodiesel 100% (Rape Seed)
17. Biodiesel (Rape Seed) with 5% by volume MS-9448 high cetane diesel fuel
18. Biodiesel (Rape Seed) with 20% by volume MS-9448 high cetane diesel fuel Note 1: AGGRESSIVE ETHANOL - 995 ml fuel grade ethanol (98% ADM Archer Daniels Midland), add 5 ml aggressive water (equivalent to 1000 ml aggressive ethanol).
Note 2: AGGRESSIVE WATER - 1 liter distilled water, ad 1 gram NaCl, add 0.9 gram $Na_2SO_4$ add 28 ml $H_3COOH$ concentrated acetic acid
Note 3: DUPONT WAIVER FUEL TP2 - 15% volume olefinic 45–50%, add volume aromatic, add 5% volume methanol, add 2.5% volume ethanol.

Water Separation Testing

Procure Fuel 5, Unleaded gas per MS-8004 Certification Grade +22% aggressive ethanol and add 2% aggressive water. Test for 1000 hours and determine extent of corrosion such as red rust or pitting.

ID Coatings or Materials found satisfactory to this standard

TABLE 7

MATERIALS TESTED AND FOUND ACCEPTABLE TO THIS STANDARD

Nickel 3.6 mm minimum undiffused (unalloyed) and nickel 5.0 mm minimum diffused (alloyed)
Copper coated ID developed from double wall copper brazed steel tubing Nickel 3.8 mm minimum undiffused (unalloyed) and nickel 5.0 mm minimum diffused (alloyed) Copper coated id developed from a double wall copper brazed steel tubing C. Gravelometer test per SAE J400 (LP-463PB-39-01) Five (5) pints at with −18 Degrees C (0 Degrees F) and salt spray per ASTM B-117 shall be tested for 1500 hours. Red rust is allowed at gravel impacted areas; 5% of impacted areas, maximum.

D. Gravelometer Salt Exposure Test
1. Test tubes per Gravelometer test—SAE J400 (LP-463PB-39-01) five (5) pints at 482 kPa (70 psi) and tubes oriented at 45 degrees from the nozzle.
2. Expose tubes to 48 hours salts spray ASTM B-117.
3. Within 2 hours following removal from salt spray, expose the tube to five (5) additional pints with gravel per SAE J400 (LP-463PB-39-01) at 482 kPa (70 psi) and tubes oriented at 45 degrees from nozzle, allow the tube to condition for 24 hours at room temperature.
4. Expose the tube to 1, 2 and 3 ones additional time.

5. Expose tubes for 400 hours.
6. Test Nylon after exposure by pulling. Nylon may lift when pulled for less than 0.35 mm (0.25 inches) and then tear.
7. After exposure, no lifting or delamination of coating is allowed. Red rust is allowed only at gravel impacted areas: 10% of the impacted areas, maximum.

E. Chrysler Proving Ground Vehicle Corrosion Test per LP-481H-117 for 170 cycles or the test equivalent of 10 years of operation. Burst strength of brake lines shall be greater than or equal to 13.789 KPa (2000 psi). Fuel lines, power steering, and transmission oil cooler lines shall be functional after the test.

5.2 Fluoride (Poly vinylidene fluoride or polyvinyl fluoride) over Zinc or Zinc Aluminum Alloy or Aluminum Rich over Zinc Aluminum Alloy, or Zinc Aluminum alloy.

A. Fluoride over Zinc or Zinc Aluminum Alloy or Aluminum Rich over Zinc Aluminum Alloy (A, B), Salt Spray corrosion resistance per ASTM B-117 shall meet 400 hours resistance to red rust at knife cut cross scribed or circumferentially scribed to tubing surface.

B. Fluoride over Zinc or Zinc Aluminum Alloy or Aluminum Rich over Zinc Aluminum Alloy (A, B). Gravelometer test per SAE J400 1 pint at −18 Degrees C (0 Degrees F) and salt spray per ASTM B-117 shall meet 1000 hours with no red rust at gravel impacted surfaces.

C. For zinc aluminum alloy, salt spray corrosion resistance for 360 hours salt spray per ASTM B-117 no more than 1% red rust over any 25.4 mm (1 inch) length compared to ASTM D 610, Plate 8.

5.3 Organic Coating Containing Chromate And Zinc particles Over Lead Tin Alloy

A. The final assembly or part shall be capable of withstanding 200 hours resistance to red rust and shall show no more than one base metal corrosion spot, 1.5 mm (0.060 in.) in diameter or larger in any area 500 mm$^2$ (0.77 square inches) when Salt Spray tested per ASTM B-117.

5.4 Nickel Electroplated coating at inside diameter of Tubing

Nickel plating 3.8 microns (0.00015 inch) minimum thickness shall show no red rust after 500 hours exposure in soak fuels referenced in Section 5.1.B.

6.0 Control

While samples may be taken from incoming shipments and checked to the requirements of this specification, the supplier shall accept the responsibility for meeting the started requirements without dependence on the purchaser☐s inspection.

Production lots shall be equivalents in every respect to samples initially approved, and any change in Materials or Processing or Processing practices require resubmission of sample parts.

7.0 General Information

Three asterisks * after the paragraph header denotes multiple technical changes to the paragraph. A triple asterisk before and after a string of test (*text***) identifies a single change.

Certain important information relative to this standard has been included in separate standards. To assure the processes submitted meet all of the Chrysler requirements, it is mandatory that the requirements in the following standards be met.

CS-9800—Application of this standard, the subscription service, and approved sources
CS-9801—General quality requirements
CS-9003—Regulated substances and recyclability Within Engineering Standards, the designations <S>, <E>, <N>, <T>, or <H> will be substituted for the Safety, Emission, Noise, Theft Prevention, or Homologation Shields respectively. The designations <D> and <P> will be submitted for the Diamond and Pentagon symbols respectively.

This standard has safety, noise, emissions or theft prevention significance only when appropriate drawings depict the coatings with a safety shield. It is necessary to review the part drawing to ascertain which parts of a standard have safety, noise, emission or theft prevention significance. Paragraph numbers in this standard shall not be charged without first reviewing the paragraph reference on all affected drawings.

Processes shall only be purchased from those sources listed under Engineering Approved Source List.

8.0 References

| | | | |
|---|---|---|---|
| CS-9003 | CS-9800 | CS-9801 | |
| LP-481-26 | LP-461H-102 | LP-461H-117 | LP-461H-80 |
| MS-1806 | MS-3235 | MS-1580 | |
| PS-77 | PS-79 | PS-1207 | QS-9000 |

ASTM Standard Methods:

A 90 Weight Of Coating On Zinc-Coated (Galvanized) Iron and Steel

B 117 Salt Spray Test

B 487 Microscopical Cross Section (1)

B 499 Magnetic Method

B 504 Coulometric Method

B 571 A Adhesion of Metallic Coatings

B 689 Electroplated Engineering Nickel Coatings

E 1182-87 Cut Section Method

A 309 Weight and Composition of Long Terne Sheet by the Triple Spot Test

***A 784 Metallic Coated Carbon Steel Wire

ITTA Test Method for Nylon 12 adhesion testing

Bundy Test Method for Nylon 12 adhesion testing (1) Permissible to utilize the minimum average technique around the circumference of tubing to measure coating thickness.

SAE Standards:
J400 Gravelometer Test

TABLE F

| Test Results: | |
|---|---|
| Section 5.1A - Scribed then 2000 Hours Salt Fog | |
| Specimen Number | Results After Salt Fog |
| 1 | No lifting or delamination between the primer and the ZnAl substrate |
| 2 | No lifting or delamination between the primer and the ZnAl substrate |
| 3 | No lifting or delamination between the primer and the ZnAl substrate |
| 4 | No lifting or delamination between the primer and the ZnAl substrate |

TABLE F-continued

Test Results:

| | |
|---|---|
| 5 | No lifting or delamination between the primer and the ZnAl substrate |
| 6 | No lifting or delamination between the primer and the ZnAl substrate |
| Requirement | No lifting or delamination between the primer and the ZnAl substrate |

Section 5.1B - Scribed, then 500 Hours Fuel Soak

| Specimen Number | Results After Fuel Soak |
|---|---|
| #1) California Phase 2 Reformulated Gasoline | |
| 1 | No lifting or delamination between the primer and the ZnAl substrate |
| 2 | No lifting or delamination between the primer and the ZnAl substrate |
| 3 | No lifting or delamination between the primer and the ZnAl substrate |
| 4 | No lifting or delamination between the primer and the ZnAl substrate |
| 5 | No lifting or delamination between the primer and the ZnAl substrate |
| 6 | No lifting or delamination between the primer and the ZnAl substrate |
| Requirement | No lifting or delamination between the primer and the ZnAl substrate |
| #2) California Phase 2 Reformulated Gasoline + 0.05% Ditertiary Butyl DiSulphide | |
| 1 | No lifting or delamination between the primer and the ZnAl substrate |
| 2 | No lifting or delamination between the primer and the ZnAl substrate |
| 3 | No lifting or delamination between the primer and the ZnAl substrate |
| 4 | No lifting or delamination between the primer and the ZnAl substrate |
| 5 | No lifting or delamination between the primer and the ZnAl substrate |
| 6 | No lifting or delamination between the primer and the ZnAl substrate |
| Requirement | No lifting or delamination between the primer and the ZnAl substrate |
| #3) Distilled Water | |
| 1 | No lifting or delamination between the primer and the ZnAl substrate |
| 2 | No lifting or delamination between the primer and the ZnAl substrate |
| 3 | No lifting or delamination between the primer and the ZnAl substrate |
| 4 | No lifting or delamination between the primer and the ZnAl substrate |
| 5 | No lifting or delamination between the primer and the ZnAl substrate |
| 6 | No lifting or delamination between the primer and the ZnAl substrate |
| Requirement | No lifting or delamination between the primer and the ZnAl substrate |
| #4) California Phase 2 Reformulated Gasoline + 0.26% Butyl Hydro Peroxide | |
| 1 | No lifting or delamination between the primer and the ZnAl substrate |
| 2 | No lifting or delamination between the primer and the ZnAl substrate |
| 3 | No lifting or delamination between the primer and the ZnAl substrate |
| 4 | No lifting or delamination between the primer and the ZnAl substrate |
| 5 | No lifting or delamination between the primer and the ZnAl substrate |
| 6 | No lifting or delamination between the primer and the ZnAl substrate |
| Requirement | No lifting or delamination between the primer and the ZnAl substrate |
| #5) Unleaded Gas + 22% Aggressive Ethanol | |
| 1 | No lifting or delamination between the primer and the ZnAl substrate |
| 2 | No lifting or delamination between the primer and the ZnAl substrate |
| 3 | No lifting or delamination between the primer and the ZnAl substrate |
| 4 | No lifting or delamination between the primer and the ZnAl substrate |
| 5 | No lifting or delamination between the primer and the ZnAl substrate |
| 6 | No lifting or delamination between the primer and the ZnAl substrate |
| Requirement | No lifting or delamination between the primer and the ZnAl substrate |
| #6) Unleaded Gas + 85% Aggressive Ethanol | |
| 1 | No lifting or delamination between the primer and the ZnAl substrate |
| 2 | No lifting or delamination between the primer and the ZnAl substrate |
| 3 | No lifting or delamination between the primer and the ZnAl substrate |
| 4 | No lifting or delamination between the primer and the ZnAl substrate |
| 5 | No lifting or delamination between the primer and the ZnAl substrate |
| 6 | No lifting or delamination between the primer and the ZnAl substrate |
| Requirement | No lifting or delamination between the primer and the ZnAl substrate |
| #7) Unleaded Gas + 10% Ethanol | |
| 1 | No lifting or delamination between the primer and the ZnAl substrate |
| 2 | No lifting or delamination between the primer and the ZnAl substrate |
| 3 | No lifting or delamination between the primer and the ZnAl substrate |
| 4 | No lifting or delamination between the primer and the ZnAl substrate |
| 5 | No lifting or delamination between the primer and the ZnAl substrate |
| 6 | No lifting or delamination between the primer and the ZnAl substrate |
| Requirement | No lifting or delamination between the primer and the ZnAl substrate |
| #8) 100% Shipping Fluid | |
| 1 | No lifting or delamination between the primer and the ZnAl substrate |
| 2 | No lifting or delamination between the primer and the ZnAl substrate |
| 3 | No lifting or delamination between the primer and the ZnAl substrate |
| 4 | No lifting or delamination between the primer and the ZnAl substrate |
| 5 | No lifting or delamination between the primer and the ZnAl substrate |
| 6 | No lifting or delamination between the primer and the ZnAl substrate |
| Requirement | No lifting or delamination between the primer and the ZnAl substrate |
| #9) Leaded Gasoline - Indolene 30 | |
| 1 | No lifting or delamination between the primer and the ZnAl substrate |
| 2 | No lifting or delamination between the primer and the ZnAl substrate |
| 3 | No lifting or delamination between the primer and the ZnAl substrate |
| 4 | No lifting or delamination between the primer and the ZnAl substrate |

TABLE F-continued

Test Results:

| | |
|---|---|
| 5 | No lifting or delamination between the primer and the ZnAl substrate |
| 6 | No lifting or delamination between the primer and the ZnAl substrate |
| Requirement | No lifting or delamination between the primer and the ZnAl substrate |

#10) Fuel C

| | |
|---|---|
| 1 | No lifting or delamination between the primer and the ZnAl substrate |
| 2 | No lifting or delamination between the primer and the ZnAl substrate |
| 3 | No lifting or delamination between the primer and the ZnAl substrate |
| 4 | No lifting or delamination between the primer and the ZnAl substrate |
| 5 | No lifting or delamination between the primer and the ZnAl substrate |
| 6 | No lifting or delamination between the primer and the ZnAl substrate |
| Requirement | No lifting or delamination between the primer and the ZnAl substrate |

#11) TFZ (Dupont Waiver Fuel)

| | |
|---|---|
| 1 | No lifting or delamination between the primer and the ZnAl substrate |
| 2 | No lifting or delamination between the primer and the ZnAl substrate |
| 3 | No lifting or delamination between the primer and the ZnAl substrate |
| 4 | No lifting or delamination between the primer and the ZnAl substrate |
| 5 | No lifting or delamination between the primer and the ZnAl substrate |
| 6 | No lifting or delamination between the primer and the ZnAl substrate |
| Requirement | No lifting or delamination between the primer and the ZnAl substrate |

Section 5.1C - Gravelometer at −18 C. then 1500 Hours Salt Fog

| Specimen Number | Results After Salt Fog |
|---|---|
| 1 | 0% red rust at impacted areas |
| 2 | 0% red rust at impacted areas |
| 3 | 0% red rust at impacted areas |
| 4 | 0% red rust at impacted areas |
| 5 | 0% red rust at impacted areas |
| 6 | 0% red rust at impacted areas |
| Requirement | <5% red rust at impacted areas |

Section 5.1D - Intermittent Room Temperature Gravelometer and Salt Fog

| Specimen Number | Peel Test Results After Final Salt Fog | Visual Results After Final Salt Fog |
|---|---|---|
| 1 | No lifting or delamination | 0% red rust at impacted areas |
| 2 | No lifting or delamination | 0% red rust at impacted areas |
| 3 | No lifting or delamination | 0% red rust at impacted areas |
| 4 | No lifting or delamination | 0% red rust at impacted areas |
| 5 | No lifting or delamination | 0% red rust at impacted areas |
| 6 | No lifting or delamination | 0% red rust at impacted areas |
| Requirement | No lifting or delamination | <10% red rust at impacted areas |

TABLE G

Test Results:
3/16" North American Nyclad GP coated steel tubing

| Specimen Number | Results After 500 Hours Fuel Soak |
|---|---|

#1) California Phase 2 Reformulated Gasoline

| | |
|---|---|
| 1 | No lifting or delamination between the primer and the ZnAl substrate or the PA12 coating |
| 2 | No lifting or delamination between the primer and the ZnAl substrate or the PA12 coating |
| 3 | No lifting or delamination between the primer and the ZnAl substrate or the PA12 coating |
| Requirement | No lifting or delamination between the primer and the ZnAl substrate or the PA12 coating |

#2) California Phase 2 Reformulated Gasoline + 0.05% Ditertiary Butyl DiSulphide

| | |
|---|---|
| 1 | No lifting or delamination between the primer and the ZnAl substrate or the PA12 coating |
| 2 | No lifting or delamination between the primer and the ZnAl substrate or the PA12 coating |
| 3 | No lifting or delamination between the primer and the ZnAl substrate or the PA12 coating |
| Requirement | No lifting or delamination between the primer and the ZnAl substrate or the PA12 coating |

#3) Distilled Water

| | |
|---|---|
| 1 | No lifting or delamination between the primer and the ZnAl substrate or the PA12 coating |
| 2 | No lifting or delamination between the primer and the ZnAl substrate or the PA12 coating |
| 3 | No lifting or delamination between the primer and the ZnAl substrate or the PA12 coating |
| Requirement | No lifting or delamination between the primer and the ZnAl substrate or the PA12 coating |

#4) California Phase 2 Reformulated Gasoline + 0.26% Butyl Hydro Peroxide

| | |
|---|---|
| 1 | No lifting or delamination between the primer and the ZnAl substrate or the PA12 coating |
| 2 | No lifting or delamination between the primer and the ZnAl substrate or the PA12 coating |
| 3 | No lifting or delamination between the primer and the ZnAl substrate or the PA12 coating |
| Requirement | No lifting or delamination between the primer and the ZnAl substrate or the PA12 coating |

#5) Unleaded Gas + 22% Aggressive Ethanol

| | |
|---|---|
| 1 | No lifting or delamination between the primer and the ZnAl substrate or the PA12 coating |
| 2 | No lifting or delamination between the primer and the ZnAl substrate or the PA12 coating |
| 3 | No lifting or delamination between the primer and the ZnAl substrate or the PA12 coating |
| Requirement | No lifting or delamination between the primer and the ZnAl substrate or the PA12 coating |

#6) Unleaded Gas + 85% Aggressive Ethanol

| | |
|---|---|
| 1 | No lifting or delamination between the primer and the ZnAl substrate or the PA12 coating |
| 2 | No lifting or delamination between the primer and the ZnAl substrate or the PA12 coating |
| 3 | No lifting or delamination between the primer and the ZnAl substrate or the PA12 coating |
| Requirement | No lifting or delamination between the primer and the ZnAl substrate or the PA12 coating |

#7) Unleaded Gas + 10% Ethanol

| | |
|---|---|
| 1 | No lifting or delamination between the primer and the ZnAl substrate or the PA12 coating |
| 2 | No lifting or delamination between the primer and the ZnAl substrate or the PA12 coating |
| 3 | No lifting or delamination between the primer and the ZnAl substrate or the PA12 coating |

TABLE G-continued

Test Results:
3/16" North American Nyclad GP coated steel tubing

| Specimen Number | Results After 500 Hours Fuel Soak |
|---|---|
| Requirement | No lifting or delamination between the primer and the ZnAl substrate or the PA12 coating |
| #8) 100% Shipping Fluid | |
| 1 | No lifting or delamination between the primer and the ZnAl substrate or the PA12 coating |
| 2 | No lifting or delamination between the primer and the ZnAl substrate or the PA12 coating |
| 3 | No lifting or delamination between the primer and the ZnAl substrate or the PA12 coating |
| Requirement | No lifting or delamination between the primer and the ZnAl substrate or the PA12 coating |
| #9) Leaded Gasoline - Indolene 30 | |
| 1 | No lifting or delamination between the primer and the ZnAl substrate or the PA12 coating |
| 2 | No lifting or delamination between the primer and the ZnAl substrate or the PA12 coating |
| 3 | No lifting or delamination between the primer and the ZnAl substrate or the PA12 coating |
| Requirement | No lifting or delamination between the primer and the ZnAl substrate or the PA12 coating |
| #10) Fuel C | |
| 1 | No lifting or delamination between the primer and the ZnAl substrate or the PA12 coating |
| 2 | No lifting or delamination between the primer and the ZnAl substrate or the PA12 coating |
| 3 | No lifting or delamination between the primer and the ZnAl substrate or the PA12 coating |
| Requirement | No lifting or delamination between the primer and the ZnAl substrate or the PA12 coating |
| #11) TFZ (Dupont Waiver Fuel) | |
| 1 | No lifting or delamination between the primer and the ZnAl substrate or the PA12 coating |
| 2 | No lifting or delamination between the primer and the ZnAl substrate or the PA12 coating |
| 3 | No lifting or delamination between the primer and the ZnAl substrate or the PA12 coating |
| Requirement | No lifting or delamination between the primer and the ZnAl substrate or the PA12 coating |

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A multi-layer tube, comprising:
   a metal tube having an outer surface;
   a zinc layer bonded to the metal tube outer surface wherein the zinc layer is selected from the group consisting of zinc plating, zinc nickel alloys, zinc cobalt alloys, zinc aluminum alloys, and mixtures thereof;
   a surface treatment layer bonded to the zinc layer, wherein the surface treatment layer is selected from the group consisting of a zinc/aluminum/rare earth alloy, phosphate, chromate, and mixtures thereof;
   a phenolic coating positioned by spray application, in overlying relationship to the surface treatment layer wherein the phenolic coating contains phenols having at least one substituted group "R", wherein R consists of H, and OH;
   a first polymeric layer bonded to the phenolic coating, wherein the first polymeric layer is selected from the group consisting of melt-processible thermoplastic elastomers, melt-processible ionomers, melt-processible nylons, melt-processible fluoropolymers, and mixtures thereof; and
   a second polymeric layer bonded to the first polymeric layer, wherein the second polymeric layer is selected from the group consisting of melt-processible nylons, melt-processible thermoplastic elastomers, melt-processible fluoropolymers, and mixtures thereof.

2. The multi-layer tube of claim 1, wherein the phenolic coating comprises carbolic acid.

3. The multi-layer tube of claim 1, wherein the first polymeric layer consists essentially of an ionomer and a nylon.

4. The multi-layer tube of claim 3, wherein the phenolic coatiang comprises carbolic acid.

5. The multi-layer tube of claim 3, wherein the phenolic coating comprises carbolic acid.

6. The multi-layer tube of claim 5, wherein the ionomer of the first polymeric layer is ethylene methacrylic acid polymer-partial metal salt, and the nylon of the first polymeric layer is Nylon 12.

7. The multi-layer tube of claim 6, wherein the ethylene methacrylic acid copolymer-partial metal salt comprises from about 10% to about 70% of the first polymeric layer, and wherein the Nylon 12 comprises from about 90% to about 30% of the first polymeric layer.

8. The multi-layer tube of claim 7, wherein the Nylon 12 is characterized by a low viscosity and low molecular weight.

9. The multi-layer tube of claim 1, wherein the zinc/aluminum/rare earth alloy of the surface treatment layer consists essentially of from about 85% to about 97% Zn, from about 3% to about 15% Al, and at least 5 ppm of a rare earth-containing alloy.

10. The multi-layer tube of claim 9 wherein the surface treatment layer has a weight in the range of from about 37.3 g/m$^2$ to about 97.7 g/m$^2$.

11. The multi-layer tube of claim 1, wherein the zinc layer has a thickness in the range of from about 10 microns to about 25 microns.

12. The multi-layer tube of claim 1, wherein the second polymeric layer consists essentially of a nylon.

13. The multi-layer tube of claim 12, wherein the nylon is Nylon 12.

14. The multi-layer tube of claim 13, wherein the Nylon 12 is characterized by a low viscosity and low molecular weight.

15. The multi-layer tube of claim 1, wherein the first polymeric layer and the second polymeric layer have a combined thickness in the range of from about 75 microns to about 300 microns.

16. The multi-layer tube of claim 15, wherein the first polymeric layer and the second polymeric layer have a combined thickness in the range of from about 125 microns to about 250 microns.

17. A multi-layer tube, comprising:
   a metal tube having an outer surface;
   a zinc layer bonded to the metal tube outer surface wherein the zinc layer is selected from the group consisting of zinc plating, zinc nickel alloys, zinc cobalt alloys, zinc aluminum alloys, and mixtures thereof;

a surface treatment layer bonded to the zinc layer, wherein the surface treatment layer is selected from the group consisting of a zinc/aluminum/rare earth alloy, phosphate, and mixtures thereof;

a priming layer comprising one or more phenols, wherein the priming layer is present in a thickness obtained by spray coating;

a first polymeric layer bonded to the priming layer, wherein the first polymeric layer is selected from the group consisting of melt-processible thermoplastic elastomers, melt-processible ionomers, melt-processible nylons, melt-processible fluoropolymers, and mixtures thereof; and a second polymeric layer bonded to the first polymeric layer, wherein the second polymeric layer is selected from the group consisting of melt-processible nylons, melt-processible thermoplastic elastomers, melt-processible fluoropolymers, and mixtures thereof.

18. The multi-layer tube of claim 17, wherein the priming layer comprises carbolic acid having a molecular weight of 50.

19. The multi-layer tube of claim 18, wherein the ionomer of the first polymeric layer is ethylene methacrylic acid copolymer-partial metal salt, and the nylon of the first polymeric layer is Nylon 12.

20. The multi-layer tube of claim 17, wherein the zinc/aluminum/rare earth alloy of the surface treatment layer consists essentially of from about 85% to about 97% Zn, from about 3% to about 15%, Al, and at least 5 ppm of a rare earth-containing alloy.

21. The multi-layer tube of claim 20, wherein the ethylene methacrylic acid copolymer-partial metal salt comprises from about 10% to about 70% of the first polymeric layer, and wherein the Nylon 12 comprises from about 90% to about 30% of the first polymeric layer.

22. The multi-layer tube of claim 21, wherein the surface treatment layer has a weight in the range of from about 37.3 $g/m^2$ to about 97.7 $g/m^2$.

23. The multi-layer tube of claim 22, wherein the second polymeric layer consists essentially of a nylon.

24. The multi-layer tube of claim 23, wherein the nylon is Nylon 12.

25. The multi-layer tube of claim 24, wherein the Nylon 12 is characterized by a low viscosity and low molecular weight.

26. The multi-layer tube of claim 25, wherein the first polymeric layer and the second polymeric layer have a combined thickness in the range of from about 125 microns to about 250 microns.

27. The multi-layer tube of claim 26, wherein the first polymeric layer and the second polymeric layer have a combined thickness in the range of from about 75 microns to about 300 microns.

28. The multi-layer tube of claim 27, wherein the zinc layer has a thickness in the range of from about 10 microns to about 25 microns.

* * * * *

UNITED STATES PATENT AND TRADEMARK OFFICE
CERTIFICATE OF CORRECTION

PATENT NO.      : 6,976,510 B2
DATED           : December 20, 2005
INVENTOR(S)     : Guido M. Campagna, James D. McDaniel and Timothy L. Schwiebert It is certified that error appears in the above-identified patent and that said Letters Patent is hereby corrected as shown below:

Title page,
Item [75], Inventors, "McDsniel" should read -- McDaniel --.

Signed and Sealed this

Fourteenth Day of March, 2006

JON W. DUDAS
*Director of the United States Patent and Trademark Office*